US 8,284,579 B2

(12) United States Patent
Shionoiri

(10) Patent No.: US 8,284,579 B2
(45) Date of Patent: Oct. 9, 2012

(54) SEMICONDUCTOR DEVICE

(75) Inventor: Yutaka Shionoiri, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 19 days.

(21) Appl. No.: 12/553,181

(22) Filed: Sep. 3, 2009

(65) Prior Publication Data

US 2010/0066325 A1    Mar. 18, 2010

(30) Foreign Application Priority Data

Sep. 17, 2008 (JP) ................................. 2008-237863

(51) Int. Cl.
*H02M 7/00* (2006.01)
(52) U.S. Cl. ........................................ 363/125; 455/41.1
(58) Field of Classification Search .................. 363/125, 363/126, 127, 108, 114; 455/39, 41.1, 41.2
See application file for complete search history.

(56) References Cited

U.S. PATENT DOCUMENTS

| | | | |
|---|---|---|---|
| 3,893,014 A * | 7/1975 | Vacek | ............................. 363/45 |
| 5,521,590 A | 5/1996 | Hanaoka et al. | |
| 5,804,997 A | 9/1998 | Nishizono et al. | |
| 5,841,641 A * | 11/1998 | Faulk | ........................ 363/21.14 |
| 5,847,662 A | 12/1998 | Yokota et al. | |
| 6,134,130 A | 10/2000 | Connell et al. | |
| 6,954,053 B2 | 10/2005 | Gay | |
| 6,975,164 B1 | 12/2005 | Matsui et al. | |
| 7,026,824 B2 | 4/2006 | Chen | |
| 7,068,148 B2 | 6/2006 | Shanks et al. | |
| 7,088,246 B2 | 8/2006 | Fukuoka | |
| 7,443,135 B2 | 10/2008 | Cho | |
| 7,538,673 B2 * | 5/2009 | Balachandran et al. | ... 340/572.1 |
| 7,738,272 B2 * | 6/2010 | Klapf et al. | ...................... 363/67 |
| 7,834,843 B2 | 11/2010 | Karaki | |
| 2001/0007529 A1 * | 7/2001 | Nishida et al. | .................. 363/19 |
| 2002/0093316 A1 | 7/2002 | Fahrenbruch | |
| 2003/0022644 A1 * | 1/2003 | Imai | .............................. 455/217 |

(Continued)

FOREIGN PATENT DOCUMENTS

EP    0596124 A    5/1994

(Continued)

OTHER PUBLICATIONS

International Search Report (Application No. PCT/JP2009/064367) Dated Oct. 20, 2009.

(Continued)

*Primary Examiner* — Nguyen Tran
(74) *Attorney, Agent, or Firm* — Eric J. Robinson; Robinson Intellectual Property Law Office, P.C.

(57) ABSTRACT

The adverse effect of noise a constant voltage receives in a semiconductor device capable of data communication through wireless communication is suppressed. Further, communication is performed normally with a constant voltage with less noise even in the case where the amount of received power is large. The semiconductor device includes an input circuit for generating a DC voltage from an AC signal, a circuit for generating a constant voltage lower than the DC voltage, a circuit portion supplied with the constant voltage, a filter, and a feedback circuit for changing impedance with the constant voltage input from the circuit for generating a constant voltage, wherein the filter is electrically connected between the input circuit and the circuit for generating a constant voltage.

12 Claims, 19 Drawing Sheets

U.S. PATENT DOCUMENTS

| | | |
|---|---|---|
| 2006/0029250 A1 | 2/2006 | Karaki |
| 2006/0267769 A1 | 11/2006 | Ito et al. |
| 2007/0268207 A1 | 11/2007 | Karaki |
| 2007/0285347 A1 | 12/2007 | Karaki |
| 2007/0290207 A1 | 12/2007 | Atsumi et al. |
| 2008/0083969 A1 | 4/2008 | Osada |
| 2008/0094027 A1 | 4/2008 | Cho |
| 2008/0123383 A1* | 5/2008 | Shionoiri ............ 363/127 |
| 2008/0174408 A1 | 7/2008 | Takahashi |
| 2008/0180080 A1 | 7/2008 | Terry et al. |
| 2008/0230821 A1 | 9/2008 | Shionoiri |
| 2008/0242005 A1 | 10/2008 | Dozen et al. |
| 2008/0260938 A1 | 10/2008 | Ikeda et al. |
| 2009/0057875 A1 | 3/2009 | Aoki et al. |
| 2009/0058601 A1* | 3/2009 | Balachandran et al. ..... 340/10.1 |

FOREIGN PATENT DOCUMENTS

| | | |
|---|---|---|
| JP | 11-088243 | 3/1999 |
| JP | 11-215026 | 8/1999 |
| JP | 2000-353217 A | 12/2000 |
| JP | 2002-368647 | 12/2002 |
| JP | 2003-085506 A | 3/2003 |
| JP | 2005-092352 | 4/2005 |
| JP | 2005-202721 A | 7/2005 |
| JP | 2005-234827 | 9/2005 |
| JP | 2006-503502 | 1/2006 |
| WO | WO 2006/137573 | 12/2006 |

OTHER PUBLICATIONS

Written Opinion (Application No. PCT/JP2009/064367) Dated Oct. 20, 2009.

* cited by examiner

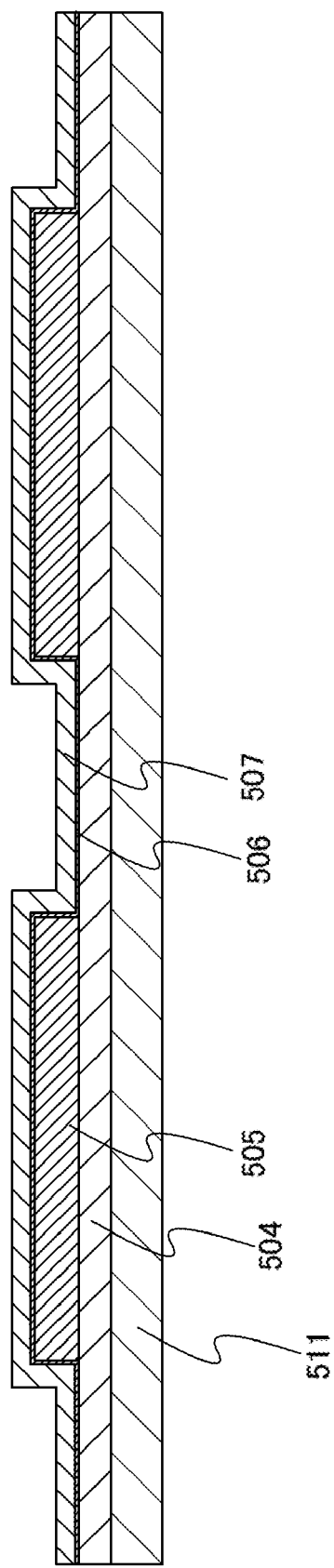
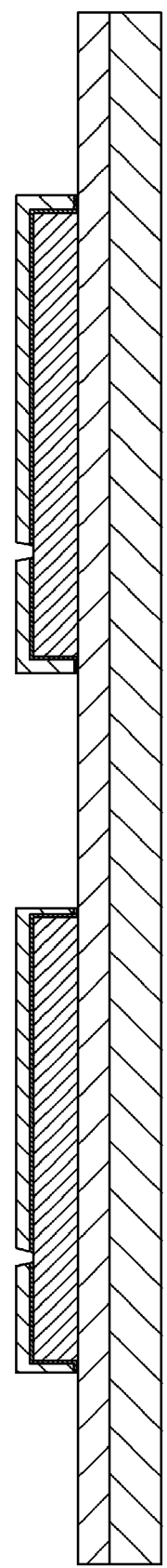
FIG. 12A
FIG. 12B

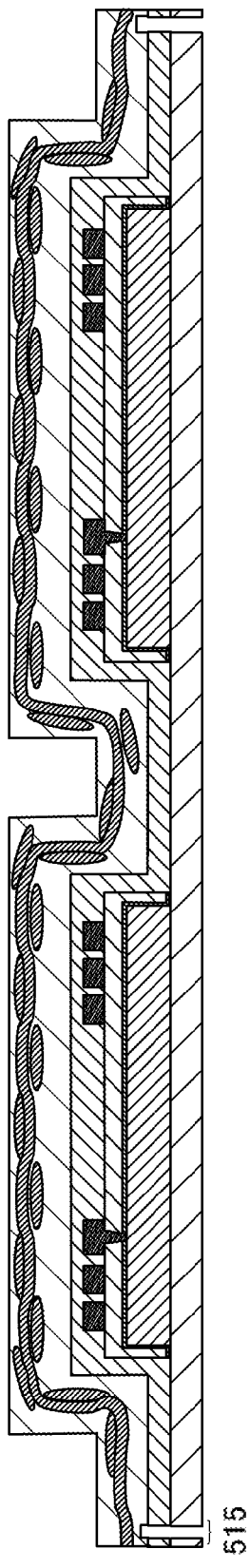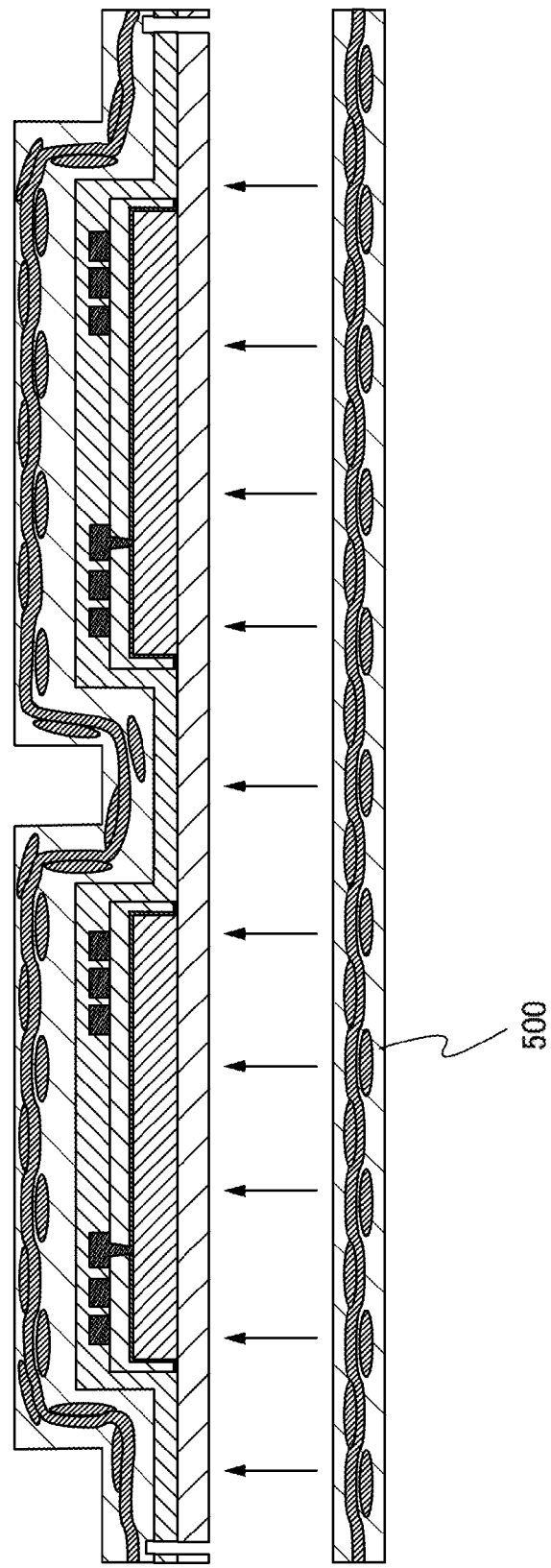

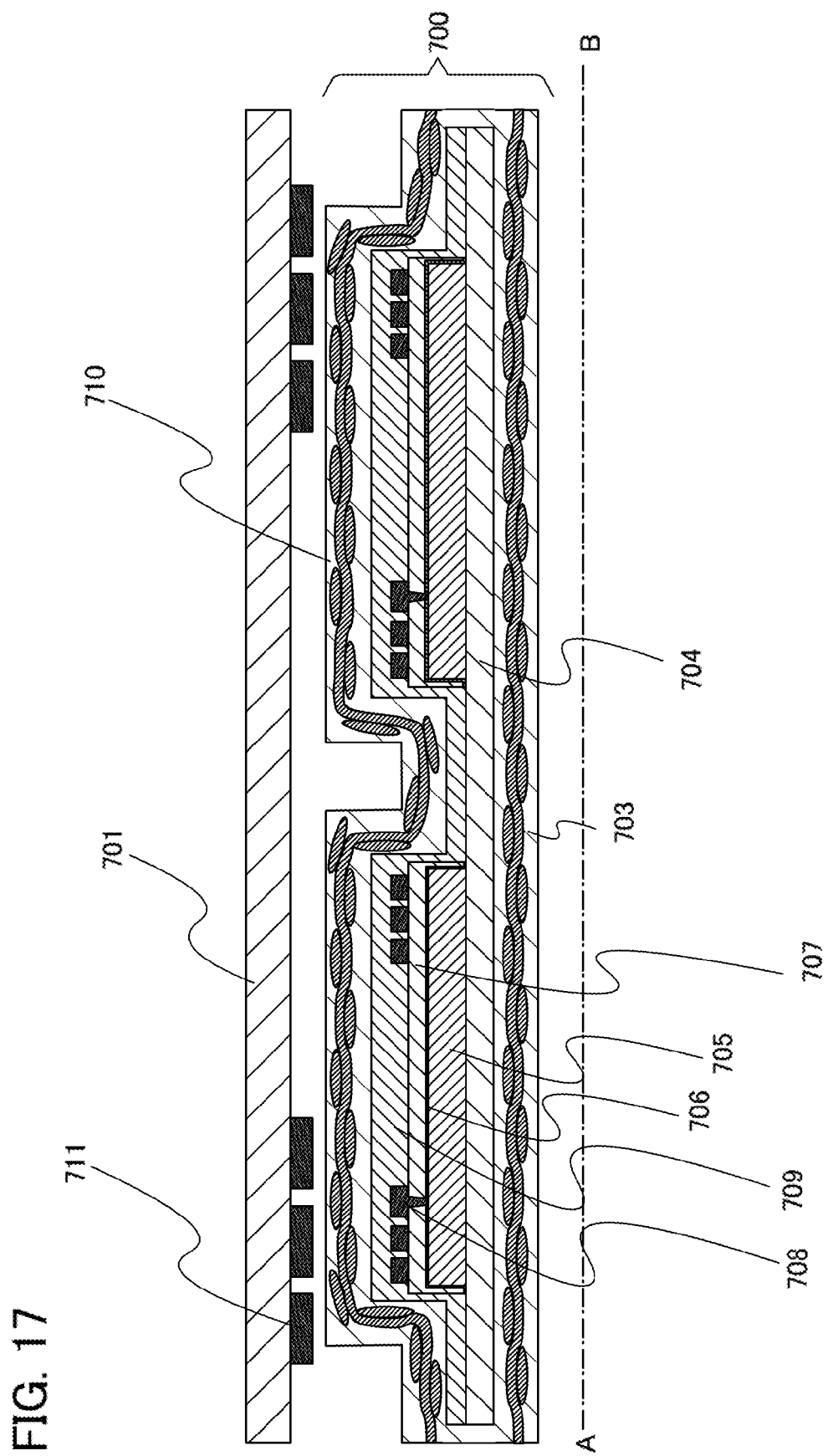

SEMICONDUCTOR DEVICE

TECHNICAL FIELD

The present invention relates to a semiconductor device capable of data communication (transmission and reception) through wireless communication.

BACKGROUND ART

In recent years, an individual identification technology using wireless communication (hereinafter referred to as a wireless communication system) has attracted attention. In particular, RFID tags (also referred to as IC tags, IC chips, RF tags, wireless tags, or electronic tags) have been useful for production, management, and the like of individual objects. In addition, RFID tags are expected to be used for personal authentification.

The wireless communication system is a system in which data communication is performed with radio signals between a transmitter/receiver serving also as a power supply source or a transmitter/receiver such as a communication device (also referred to as an interrogator or a reader/writer), and a transmitter/receiver such as an RFID tag (hereinafter referred to as an RFID tag).

As for the wireless communication system, research and development for improving efficiency of power supply from a communication device to an RFID tag have been actively conducted in order to extend a communication distance between the communication device and the RFID tag.

In general, power attenuates in proportion to square of the distance from a spot where power is emitted to an observation spot. That is, the longer the distance between a communication device and an RFID tag (hereinafter referred to as a communication distance) is, the smaller amount of power the RFID tag receives, whereas the shorter the communication distance is, the larger amount of power the RFID tag receives.

The amount of power the RFID tag receives is large, which means that the amplitude of a signal received is large. The amount of power the RFID tag receives is small, which means that the amplitude of a signal received is small.

In the case of using an RFID tag, noise might cause a problem (Patent Document 1). Since when the amplitude of the received signal is large, the amount of noise is large, a constant voltage for the RFID tag to operate is fluctuated due to noise and thus a malfunction might occur. Meanwhile, when the amplitude of the received signal is small, the amount of noise is small; however, the received signal itself is significantly adversely affected by momentary external noise, a constant voltage for the RFID tag to operate is fluctuated, and thus a malfunction might occur.

REFERENCE

[Patent Document 1] Japanese Translation of PCT International Application No. 2006-503502

DISCLOSURE OF INVENTION

In view of the above problems, an object is to suppress the adverse effect of noise a constant voltage receives in a semiconductor device capable of data communication through wireless communication as much as possible. Further, an object is to perform communication normally with a constant voltage with less noise even in the case where the amount of power an RFID tag receives is large.

The present invention provides a semiconductor device having the following structure in order to solve the above problems.

In a semiconductor device according to an embodiment of the present invention, a filter is provided between an input circuit and a circuit for generating a constant voltage, such as a regulator, a constant voltage circuit, or a limiter circuit.

With a circuit into which a constant voltage generated in the circuit for generating a constant voltage is input (hereinafter referred to as a feedback circuit), impedance of the semiconductor device can be changed.

The feedback circuit may be any circuit or element as long as it can change impedance of the semiconductor device by input of the generated constant voltage. For example, the feedback circuit may be an element such as a variable resistor or a variable capacitor or a circuit in which diode elements are connected in series.

In a semiconductor device capable of data communication through wireless communication, a filter is provided between an input circuit and a circuit for generating a constant voltage, such as a regulator, a constant voltage circuit, or a limiter circuit. By providing the filter, noise input to a circuit for generating a constant voltage, such as a regulator, a constant voltage circuit, or a limiter circuit, is removed. Accordingly, the constant voltage is less likely to fluctuate, so that a malfunction or an operation defect such as complete inoperative can be prevented. Further, fluctuation in the constant voltage input to a feedback circuit is suppressed. Feedback is performed with the constant voltage thus generated so that input impedance is changed; thus, a circuit which is less likely to be broken even if a large amount of power is input to the circuit can be provided.

BRIEF DESCRIPTION OF DRAWINGS

In the Accompanying Drawings:

FIGS. 12A and 12B are cross-sectional views illustrating a method for manufacturing a semiconductor device, according to Embodiment 5 which is an embodiment of the present invention;

FIGS. 15A and 15B are cross-sectional views illustrating a method for manufacturing a semiconductor device, according to Embodiment 5 which is an embodiment of the present invention;

FIG. 17 is a cross-sectional view illustrating another structure of a semiconductor device, according to Embodiment 5 which is an embodiment of the present invention;

BEST MODE FOR CARRYING OUT THE INVENTION

Figure 1:
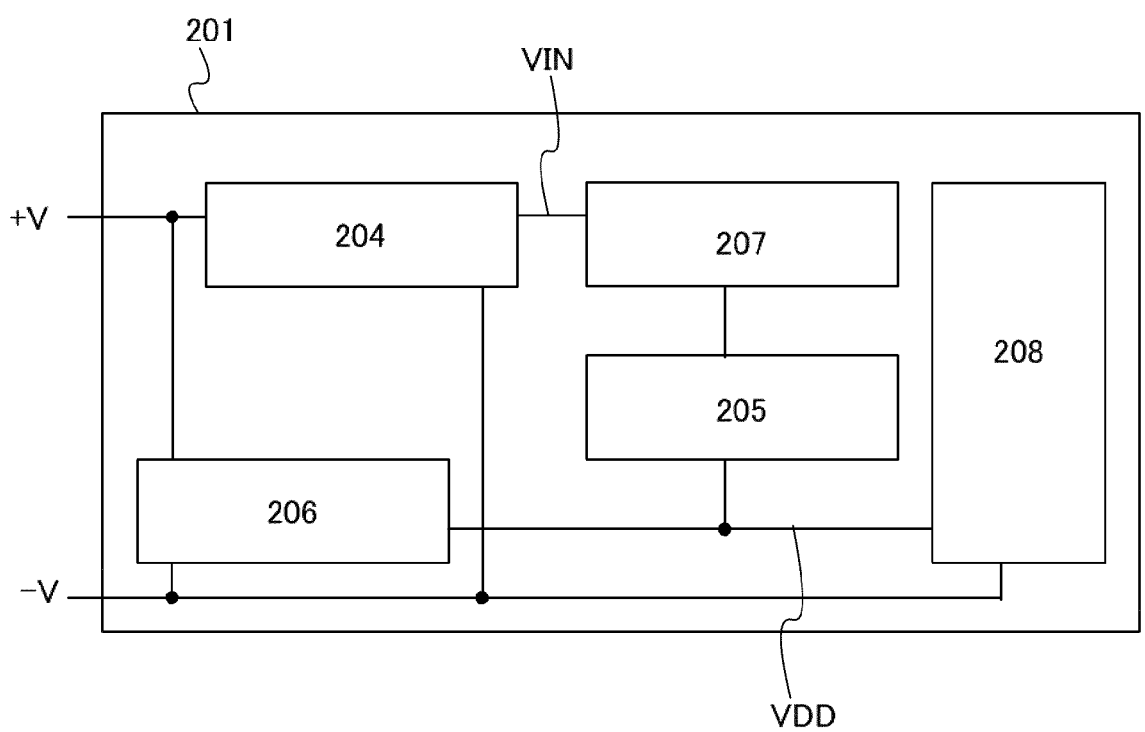
FIG. 1 is a diagram illustrating Embodiment 1 which is an embodiment of the present invention.

The embodiments of the present invention will be specifically described with reference to the drawings. However, the present invention disclosed herein is not limited to the following description because it will be easily understood by those skilled in the art that various changes and modifications can be made to the modes and their details without departing from the spirit and scope of the present invention disclosed herein. Therefore, the present invention disclosed herein should not be construed as being limited to the description in the following embodiments. Note that a common reference numeral refers to the same part throughout the drawings in the structure of the present invention described below.

Further, in the present invention, a connection means an electrical connection. Therefore, another element or the like may be provided between elements.

Embodiment 1

A semiconductor device capable of data communication through wireless communication, which is an embodiment of the present invention, will be described.

A semiconductor device 201 includes an input circuit 204, a circuit 205 for generating a constant voltage, a feedback circuit 206, a filter 207, and a circuit portion 208 (FIG. 1).

The input circuit 204 rectifies an AC signal which is input to generate a DC signal. The input circuit 204 may be any circuit as long as it rectifies a signal which is input to generate a DC voltage. For example, a circuit in which a rectifier circuit such as a half-wave rectifier circuit or a full-wave rectifier circuit is combined with an element such as a capacitor or a coil is given.

The circuit 205 for generating a constant voltage generates a constant voltage less than or equal to a DC voltage generated in the input circuit 204. The circuit 205 for generating a constant voltage may be any circuit as long as it can hold the generated voltage constant. For example, a regulator is given.

The feedback circuit 206 changes impedance of the semiconductor device 201 with the constant voltage generated in the circuit 205 for generating a constant voltage and prevents generation of strong power supply even if high-intensity radio waves are received. The feedback circuit 206 may be any circuit as long as it can change impedance of the semiconductor device 201. For example, a circuit in which a switching element using one transistor is combined with a resistor is given.

The filter 207 is provided between the input circuit 204 and the circuit 205 for generating a constant voltage. The filter 207 removes noise added to the DC voltage generated in the input circuit 204 and the DC voltage from which noise is removed is supplied to the circuit 205 for generating a constant voltage.

As the filter 207, for example, a circuit in which a resistor and a capacitor are connected in series is given. By adjusting the product of the resistance value of the resistor and the capacitance value of the capacitor, the frequency of noise desired to be removed can be adjusted.

In the case where the resistor and the capacitor are connected in series, assuming that the frequency is $f_c$, the capacitance value is C, and the resistance value is R, $f_c < 1/(2\pi CR)$ is satisfied. This formula shows that a frequency lower than $1/(2\pi CR)$ is likely to pass through the filter while a frequency higher than $1/(2\pi CR)$ is less likely to pass through the filter. By using this formula, the capacitance value C and the resistance value R can be estimated in accordance with the frequency of the noise added to the DC voltage, which is desired to be removed.

For example, to remove noise with a frequency of higher than 1 MHz, CR may be smaller than $160 \times 10^{-9}$ by using the above formula. For example, C=16 pF and R=10 kΩ may be satisfied.

The semiconductor device according to an embodiment of the present invention removes noise input to the circuit for generating a constant voltage, such as a regulator, a constant voltage circuit, or a limiter circuit. Accordingly, the constant voltage is less likely to fluctuate, so that a malfunction or an operation defect such as complete inoperative can be prevented. Further, as a result, fluctuation in the constant voltage input to the feedback circuit is suppressed. Feedback is performed with the constant voltage whose fluctuation is suppressed so that input impedance is changed; thus, a circuit which is less likely to be broken even if a large amount of power is input to the circuit can be provided.

Embodiment 2

A structure and operation of a semiconductor device according to an embodiment of the present invention when it is used for an RFID tag will be described.

First, the structure will be described.

Figure 3:
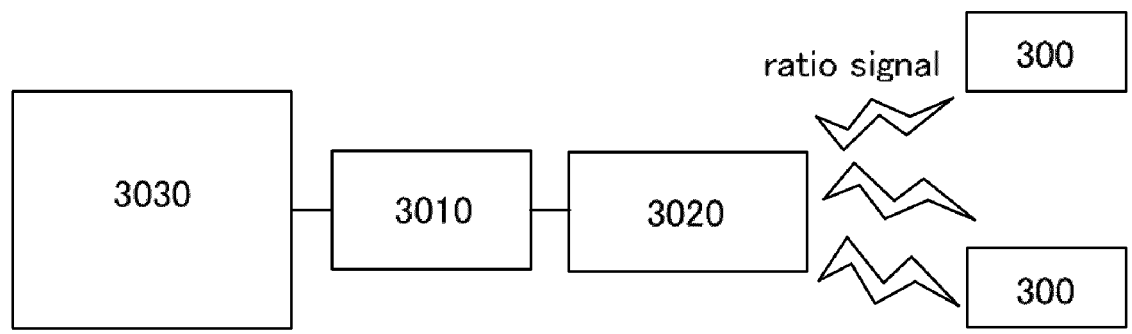
FIG. 3 is a diagram illustrating Embodiment 2 which is an embodiment of the present invention.

FIG. 3 is a schematic diagram of a wireless communication system. The wireless communication system mainly includes a communication device 3010, an antenna unit 3020 which is connected to the communication device 3010, an RFID tag 300, and a controlling terminal 3030 which controls the communication device.

Figure 2:
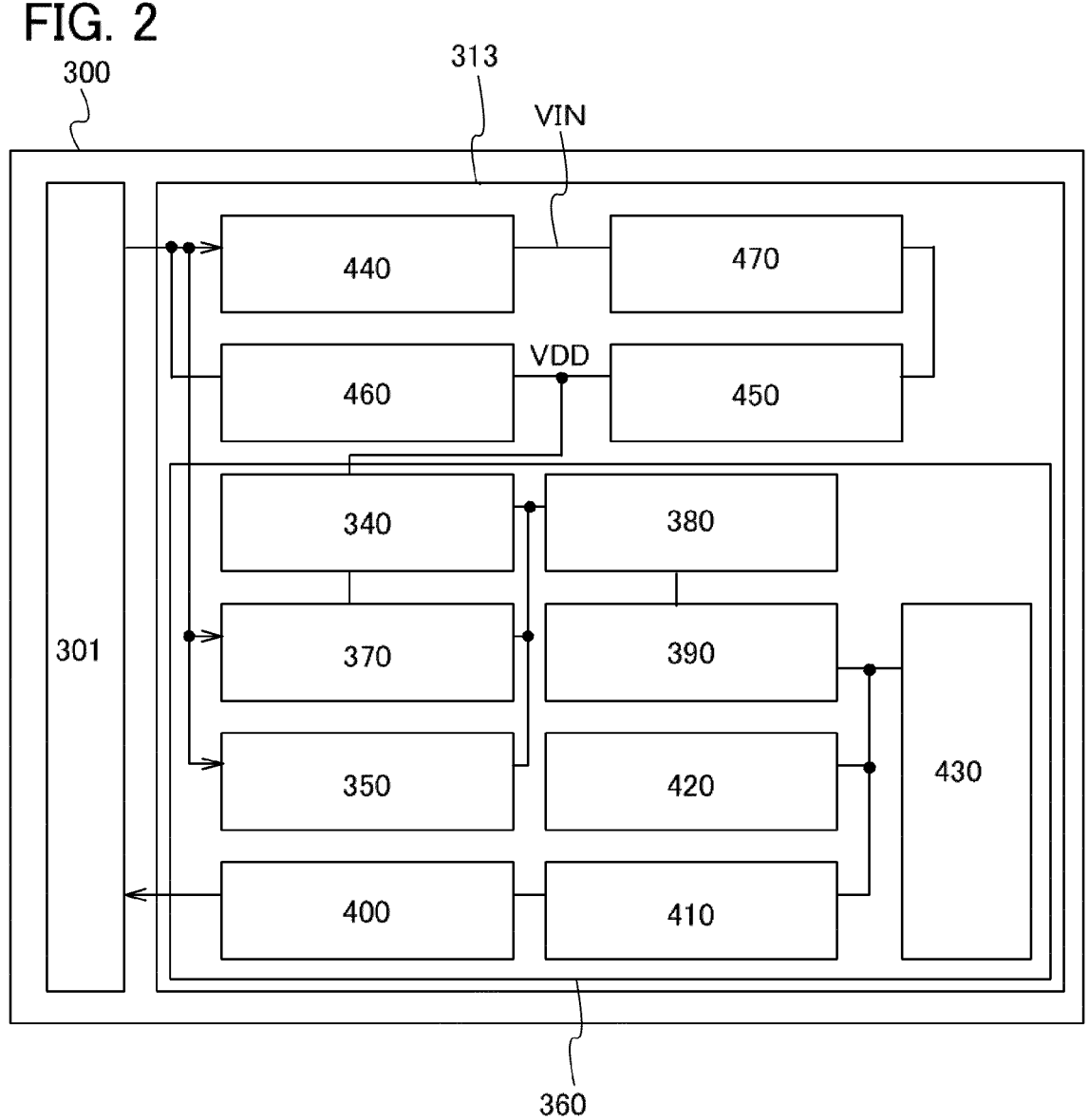
FIG. 2 is a diagram illustrating Embodiment 2 which is an embodiment of the present invention.

A circuit configuration of the RFID tag 300 is shown in FIG. 2. The RFID tag 300 includes an antenna 301 and a semiconductor integrated circuit 313. Note that the RFID tag 300 according to an embodiment of the present invention does not necessarily include an antenna circuit. The semiconductor integrated circuit 313 includes an input circuit 440, a circuit 450 for generating a constant voltage, a feedback circuit 460, a filter 470, and a circuit portion 360 which are components of the semiconductor device according to an embodiment of the present invention. The circuit portion 360 includes a reset circuit 340, a demodulation circuit 350, a clock generation circuit 370, a code extraction circuit 380, a code identification circuit 390, a modulation circuit 400, a signal output control circuit 410, a cyclic redundancy check (hereinafter referred to as CRC) circuit 420, and a memory 430.

Next, operation will be described with reference to FIGS. 2 and 3.

A radio signal is transmitted from the antenna unit 3020 which is connected to the communication device 3010. The radio signal includes a command from the communication device 3010 to the RFID tag 300. Then, the radio signal is received by the antenna 301 included in the RFID tag 300.

The radio signal received by the antenna 301 is transmitted as an AC signal, which is an electrical signal, to the input circuit 440. The input circuit 440 includes a rectifier circuit and a capacitor. The radio signal received is rectified by passing through the rectifier circuit and then smoothed by the capacitor. Then, the input circuit 440 generates a DC voltage (hereinafter referred to as $V_{IN}$).

Although the capacitor is used when the input circuit 440 generates the $V_{IN}$, a coil or both a coil and the capacitor may be used. The input circuit 440 may have any configuration as long as it can generate $V_{IN}$ from the rectified signal.

The $V_{IN}$ is transmitted to the circuit 450 for generating a constant voltage through the filter 470, and a constant voltage (hereinafter referred to as $V_{DD}$) is generated therein. The filter 470 removes noise added to the $V_{IN}$. Accordingly, fluctuation in the $V_{DD}$ is suppressed. The $V_{DD}$ is input to the feedback circuit 460. The feedback circuit 460 operates and changes input impedance, so that a circuit which is less likely to be broken even if a large amount of power is input to the circuit can be provided.

The $V_{DD}$ is supplied to each circuit block. Note that low power supply potential ($V_{SS}$) is common in this embodiment.

The radio signal received by the antenna 301 is also transmitted as an AC signal to the demodulation circuit 350. The demodulation circuit 350 rectifies and demodulates the signal.

The demodulated signal may be amplified by providing an analog amplifier next to the demodulation circuit 350. By amplifying the demodulated signal, a signal waveform is shaped. If the signal waveform has a gentle curve, delay of the signal is significant and the operation becomes unstable in some cases. However, when the signal waveform is shaped, delay of the signal is short and operation can be stable.

Further, the radio signal received by the antenna 301 is also transmitted as the AC signal to the clock generation circuit 370. The clock generation circuit 370 divides the frequency of the AC signal and generates a reference clock signal. The reference clock signal generated by the clock generation circuit 370 is transmitted to each circuit block and used for latch and selection of signals in each circuit block, time counting, and the like.

The demodulated signal and the reference clock signal are transmitted to the code extraction circuit 380. The code extraction circuit 380 extracts a command, which is transmitted from the communication device 3010 to the RFID tag 300, from the demodulated signal. In addition, the code extraction circuit 380 generates a signal which controls the code identification circuit 390.

The command extracted by the code extraction circuit 380 is transmitted to the code identification circuit 390. The code identification circuit 390 identifies the command from the communication device 3010. In addition, the code identification circuit 390 controls the CRC circuit 420, the memory 430, and the signal output control circuit 410.

As described above, the command from the communication device 3010 is identified and the CRC circuit 420, the memory 430, and the signal output control circuit 410 are operated in accordance with the identified command. Then, a signal including unique data such as an ID number which is stored or written in the memory 430 is output, or data is stored in the memory 430.

The signal output control circuit 410 converts the signal including unique data such as an ID number which is stored or written in the memory 430 into a signal encoded by an encoding method which meets a standard such as ISO. In accordance with the encoded signal, the radio signal received by the antenna 301 is modulated by the modulation circuit 400.

The modulated signal is received by the antenna unit 3020 which is connected to the communication device 3010. Then, the received signal is analyzed in the communication device 3010 to recognize the unique data such as the ID number in the RFID tag 300 that uses the semiconductor device according to an embodiment of the present invention.

By employing the above structure, the semiconductor device according to an embodiment of the present invention removes noise input to a circuit for generating a constant voltage, such as a regulator, a constant voltage circuit, or a limiter circuit. Accordingly, the constant voltage is less likely to fluctuate, so that a malfunction or an operation defect such as complete inoperative can be prevented. Further, as a result, fluctuation in the constant voltage input to a feedback circuit is suppressed. Feedback is performed with the constant voltage whose fluctuation is suppressed so that input impedance is changed; thus, a circuit which is less likely to be broken even if a large amount of power is input to the circuit can be provided.

This embodiment can be implemented by being combined as appropriate with the above embodiment.

Embodiment 3

A circuit configuration of a semiconductor device according to an embodiment of the present invention will be described.

Figure 4:
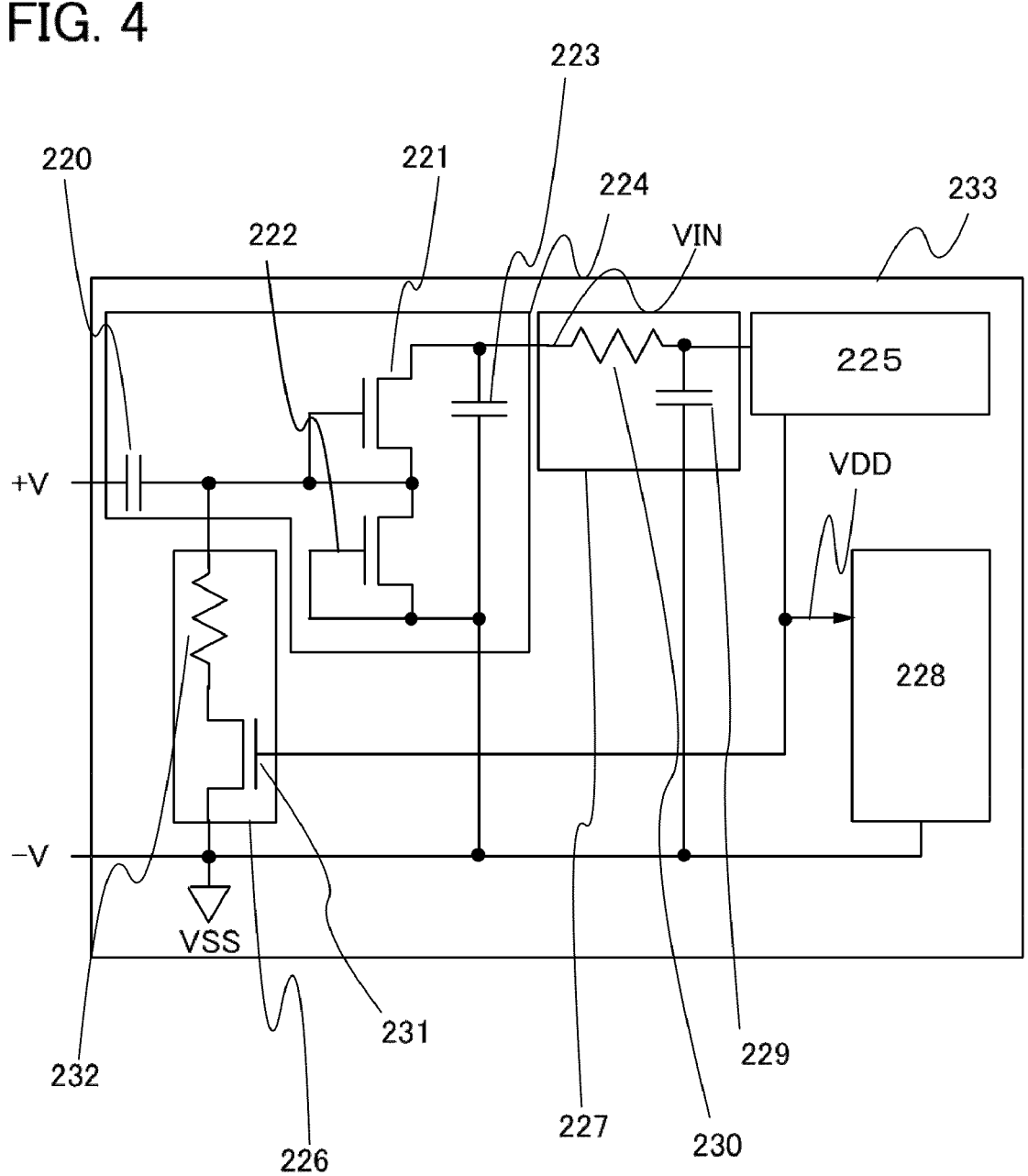
FIG. 4 is a diagram illustrating Embodiment 3 which is an embodiment of the present invention.

A semiconductor device 233 includes an input circuit 224, a circuit 225 for generating a constant voltage, a feedback circuit 226, a filter 227, and a circuit portion 228 (FIG. 4).

Two input terminals +V and −V of the semiconductor device 233 are connected to a + terminal and a − terminal of an element which receives a radio signal, such as an antenna, respectively.

The input circuit 224 includes a first capacitor 220, a first transistor 221, a second transistor 222, and a second capacitor 223. One terminal of the first capacitor 220 is connected to the +V terminal, and the other terminal is connected to a gate terminal and a source terminal of the first transistor 221. The gate terminal and the source terminal of the first transistor 221 are connected to each other and the first transistor 221 functions as a diode. In addition, a drain terminal of the first transistor 221 is connected to one terminal of the second capacitor 223. In a manner similar to the case of the first transistor 221, a gate terminal and a source terminal of the second transistor 222 are connected to each other and the second transistor 222 functions as a diode. Further, a drain terminal of the second transistor 222 is connected to the gate terminal and the source terminal of the first transistor 221. Furthermore, the gate terminal and the source terminal of the second transistor 222 are connected to the other terminal of the second capacitor 223. Note that the other terminal of the second capacitor 223 is also connected to the −V terminal. The first capacitor 220, the first transistor 221 and the second transistor 222 composes a half-wave voltage doubler rectifier circuit.

The filter 227 includes a first resistor 230 and a third capacitor 229. One terminal of the first resistor 230 is connected to one terminal of the second capacitor 223, and the other terminal of the first resistor 230 is connected to one terminal of the third capacitor 229 and an input of the circuit 225 for generating a constant voltage. The other terminal of the third capacitor 229 is connected to the −V terminal. Although the third capacitor 229 is connected to the −V terminal and one terminal of the first resistor 230 in FIG. 4, the third capacitor 229 may be connected to the −V terminal and the other terminal of the first resistor 230.

The feedback circuit 226 includes a third transistor 231 and a second resistor 232. A source terminal, a gate terminal, and a drain terminal of the third transistor 231 are connected to the −V terminal, an output of the circuit 225 for generating a constant voltage, and one terminal of the second resistor 232, respectively. The other terminal of the second resistor 232 is connected to the other terminal of the first capacitor 220 in the input circuit 224, and the gate terminal and the source terminal of the first transistor 221.

Although an example is described in which the feedback circuit 226 includes the third transistor 231 and the second resistor 232, the second resistor 232 can be replaced with a capacitor or a diode. The feedback circuit 226 may be any circuit as long as it can change impedance of the semiconductor device 233.

Operation of the semiconductor device 233 will be briefly described. A radio signal received by an antenna is input as an AC signal to the input circuit 224. The AC signal input to the input circuit 224 is rectified by the half-wave voltage doubler rectifier circuit to generate a signal whose amplitude is approximately twice as large as the amplitude of a half-wave of the AC signal. Then, the generated signal is smoothed by the second capacitor 223 to be a DC voltage (hereinafter also referred to as $V_{IN}$).

The $V_{IN}$ passes through the filter 227 and is transmitted to the circuit 225 for generating a constant voltage, so that a constant voltage (hereinafter referred to as $V_{DD}$) which is lower than $V_{IN}$ and is more stable is generated. The circuit 225 for generating a constant voltage may have any circuit configuration as long as it can hold the voltage, which is generated by one or both of a voltage and a current, constant. For example, a regulator circuit is given.

The filter 227 removes noise added to the $V_{IN}$ generated in the input circuit 224 and the DC voltage from which noise is removed can be supplied to the circuit 225 for generating a constant voltage.

Accordingly, fluctuation in the $V_{DD}$ generated in the circuit 225 for generating a constant voltage is suppressed.

In the case where one resistor and one capacitor are connected as in the case of the filter 227 having the above configuration, assuming that the frequency is $f_c$, the capacitance value is C, and the resistance value is R, $f_c < 1/(2\pi CR)$ is satisfied. This formula shows that a frequency lower than $1/(2\pi CR)$ is likely to pass through the filter while a frequency higher than $1/(2\pi CR)$ is less likely to pass through the filter. By using this formula, the capacitance value C and the resistance value R can be estimated in accordance with the frequency of the noise added to the $V_{DD}$, which is desired to be removed.

For example, to remove noise with a frequency of higher than 1 MHz, CR may be smaller than $160 \times 10^{-9}$ by using the aforementioned formula. For example, C=16 pF and R=10 kΩ may be satisfied.

The $V_{DD}$ is supplied to the circuit portion 228. In addition, the $V_{DD}$ is also input to the feedback circuit 226.

When the generated $V_{DD}$ exceeds the threshold voltage of the third transistor 231 in the feedback circuit 226, the third transistor 231 comes to be in a state of conduction. Conduction means that a transistor is turned on and a current flows. A current flows from the other terminal of the first capacitor 220 in the input circuit 224 to which the AC signal is input, from the gate terminal and the source terminal of the first transistor 221, and from the drain terminal of the second transistor 222 through the second resistor 232 and the third transistor 231, whereby impedance of the semiconductor device 233 can be changed.

In the above configuration, all transistors are n-channel transistors but p-channel transistors may alternatively be used.

By employing the above configuration, the semiconductor device according to an embodiment of the present invention removes noise input to a circuit for generating a constant voltage. Accordingly, the constant voltage is less likely to fluctuate, so that a malfunction or an operation defect such as complete inoperative can be prevented. Further, as a result, fluctuation in the constant voltage input to a feedback circuit is suppressed. Feedback is performed with the constant voltage whose fluctuation is suppressed so that input impedance is changed; thus, a circuit which is less likely to be broken even if a large amount of power is input to the circuit can be provided.

This embodiment can be implemented by being combined as appropriate with any of the above embodiments.

Embodiment 4

In Embodiment 4, another example of a filter circuit included in a semiconductor device according to an embodiment of the present invention will be described.

Figure 5:
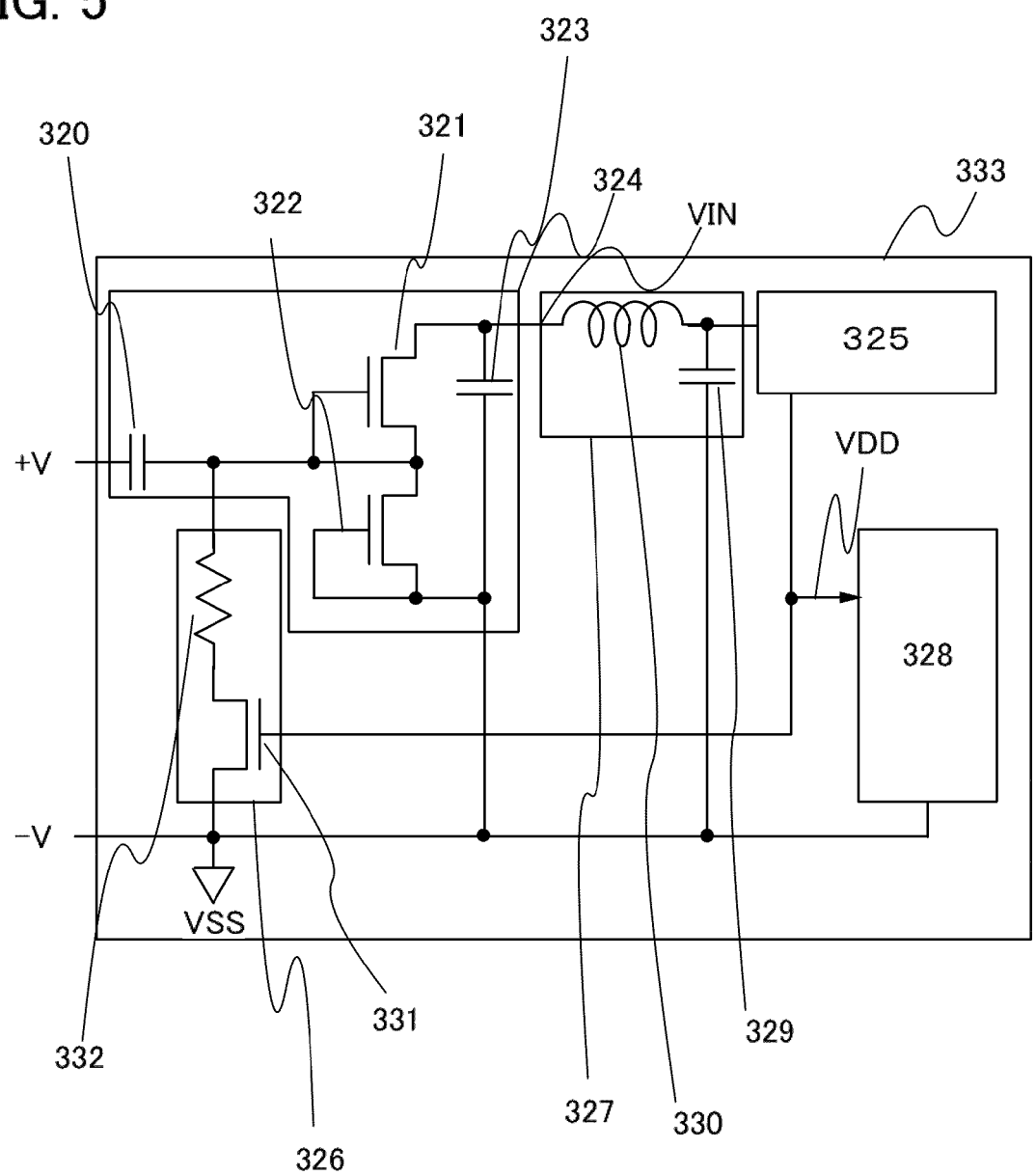
FIG. 5 is a diagram illustrating Embodiment 4 which is an embodiment of the present invention.

A semiconductor device 333 includes an input circuit 324, a circuit 325 for generating a constant voltage, a feedback circuit 326, a filter 327, and a circuit portion 328 (FIG. 5).

Two input terminals +V and −V of the semiconductor device 333 are connected to a + terminal and a − terminal of an element, which receives a radio signal, such as an antenna, respectively.

The input circuit 324 includes a first capacitor 320, a first transistor 321, a second transistor 322, and a second capacitor 323. One terminal of the first capacitor 320 is connected to the +V terminal and the other terminal of the first capacitor 320 is connected to a gate terminal and a source terminal of the first transistor 321. The gate terminal and the source terminal of the first transistor 321 are connected to each other, and the first transistor 321 functions as a diode. In addition, a drain terminal of the first transistor 321 is connected to one terminal of the second capacitor 323. In a manner similar to the case of the first transistor 321, a gate terminal and a source terminal of the second transistor 322 are connected to each other, and the second transistor 322 functions as a diode. Further, a drain terminal of the second transistor 322 is connected to the gate terminal and the source terminal of the first transistor 321. Furthermore, the gate terminal and the source terminal of the second transistor 322 are connected to the other terminal of the second capacitor 323. Note that the other terminal of the second capacitor 323 is also connected to the −V terminal.

The first capacitor 320, the first transistor 321, and the second transistor 322 compose a half-wave voltage doubler rectifier circuit.

A filter 327 includes a first inductor 330 and a third capacitor 329. One terminal of the first inductor 330 is connected to one terminal of the third capacitor 329 and an input of the circuit 325 for generating a constant voltage. The other terminal of the first inductor 330 is connected to the second capacitor 323 and an output of the input circuit 324. The other terminal of the third capacitor 329 is connected to the −V terminal. Although the third capacitor 329 is connected to the −V terminal and the one terminal of the first inductor 330 in FIG. 5, the third capacitor 329 may be connected to the −V terminal and the other terminal of the first inductor 330.

The feedback circuit 326 includes a third transistor 331 and a second resistor 332. A source terminal, a gate terminal, and a drain terminal of the third transistor 331 are connected to the −V terminal, the output of the circuit 325 for generating a constant voltage, and one terminal of the second resistor 332, respectively. The other terminal of the second resistor 332 is connected to the other terminal of the first capacitor 320 in the input circuit 324, and the gate terminal and the source terminal of the first transistor 321.

Although an example is described in which the feedback circuit 326 in FIG. 5 includes the third transistor 331 and the second resistor 332, the second resistor 332 may be replaced with a capacitor or a diode. The feedback circuit 326 may be any circuit as long as it can change impedance of the semiconductor device 333.

Operation of the semiconductor device 333 will be briefly described. A radio signal received by an antenna is input as an AC signal to the input circuit 324. The AC signal input to the input circuit 324 is rectified by the half-wave voltage doubler rectifier circuit to generate a signal whose amplitude is approximately twice as large as that of a half-wave of the AC signal. Then, the generated signal is smoothed by the second capacitor 323 to be a DC voltage (hereinafter also referred to as $V_{IN}$).

The $V_{IN}$ passes through the filter 327 and is transmitted to the circuit 325 for generating a constant voltage, so that a constant voltage (hereinafter referred to as $V_{DD}$) which is lower than $V_{IN}$ and is more stable is generated. The circuit 325 for generating a constant voltage may have any circuit configuration as long as it can hold the voltage, which is generated by one or both of a voltage and a current, constant. For example, a regulator circuit is given.

The filter 327 removes noise added to the $V_{IN}$ generated in the input circuit 324 and the DC voltage from which noise is removed can be supplied to the circuit 325 for generating a constant voltage.

Accordingly, fluctuation in the $V_{DD}$ generated in the circuit 325 for generating a constant voltage is suppressed.

In the case where one inductor and one capacitor are connected to each other as in the case of the filter 327 having the above configuration, assuming that the frequency is $f_c$, the inductance is L, and the capacitance value is C, $f_c<1/(2\pi(LC)^{1/2})$ is satisfied. This formula shows that a frequency $f_c$ lower than $1/(2\pi(LC)^{1/2})$ is likely to pass through the filter while a frequency higher than $1/(2\pi(LC)^{1/2})$ is less likely to pass through the filter. By using this formula, the inductance is L and the capacitance value C can be estimated in accordance with the frequency of the AC signal whose transmission is desired to be suppressed. Note that assuming that the nominal impedance is R, $R=(L/C)^{1/2}$ is satisfied.

For example, to make a frequency that is higher than 1 MHz less likely to pass through the filter, LC may be smaller than $1.38 \times 10^{-16}$ by using the aforementioned formula. For example, L=3 µH, C=46 pF, and R≈256Ω may be satisfied.

The $V_{DD}$ is supplied to the circuit portion 328. In addition, the $V_{DD}$ is also input to the feedback circuit 326.

When the generated $V_{DD}$ exceeds the threshold voltage of the third transistor 331 in the feedback circuit 326, the third transistor 331 comes to be in a state of conduction. A current flows from the other terminal of the first capacitor 320 in the input circuit 324 to which the AC signal is input, from the gate terminal and the source terminal of the first transistor 321, and from the drain terminal of the second transistor 322 through the second resistor 332 and the third transistor 331, whereby impedance of the semiconductor device 333 can be changed.

In the above configuration, all transistors are n-channel transistors but p-channel transistors may alternatively be used.

By employing the above configuration, noise input to a circuit for generating a constant voltage is removed. Accordingly, the constant voltage is less likely to fluctuate, so that a malfunction or an operation defect such as complete inoperative can be prevented. Further, as a result, fluctuation in the constant voltage input to a feedback circuit is suppressed. Feedback is performed with the constant voltage whose fluctuation is suppressed so that input impedance is changed; thus, a circuit which is less likely to be broken even if a large amount of power is input to the circuit can be provided.

This embodiment can be implemented by being combined as appropriate with any of the above embodiments.

Embodiment 5

In this embodiment, an example of a structure of a semiconductor device according to an embodiment of the present invention will be described.

Figure 6A:
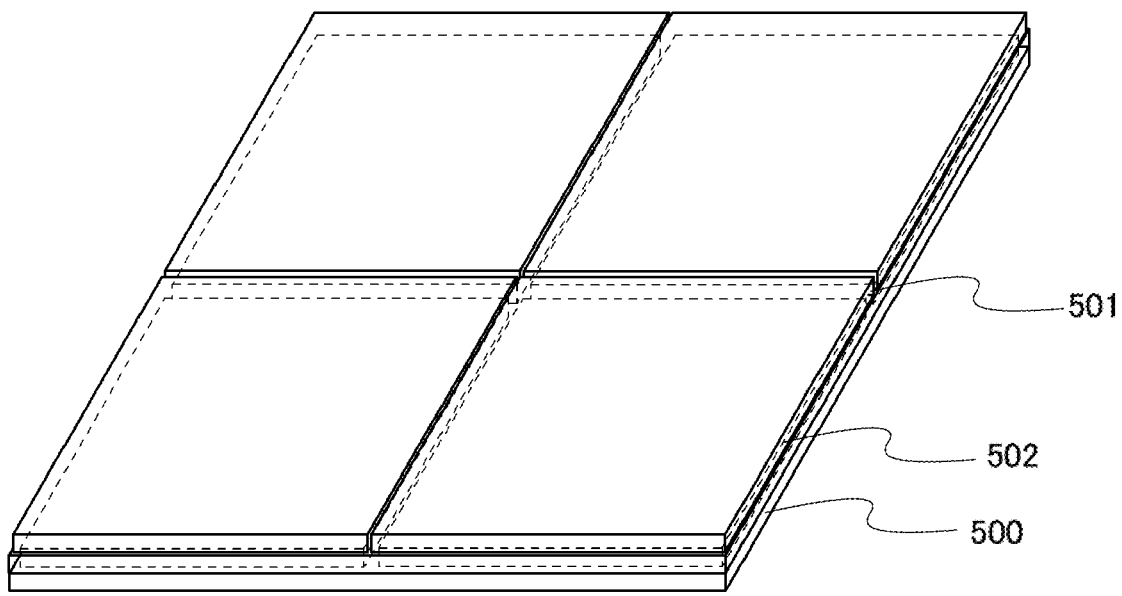
FIGS. 6A and 6B are perspective views each illustrating a structure of a semiconductor device, according to Embodiment 5 which is an embodiment of the present invention.
Figure 6B:
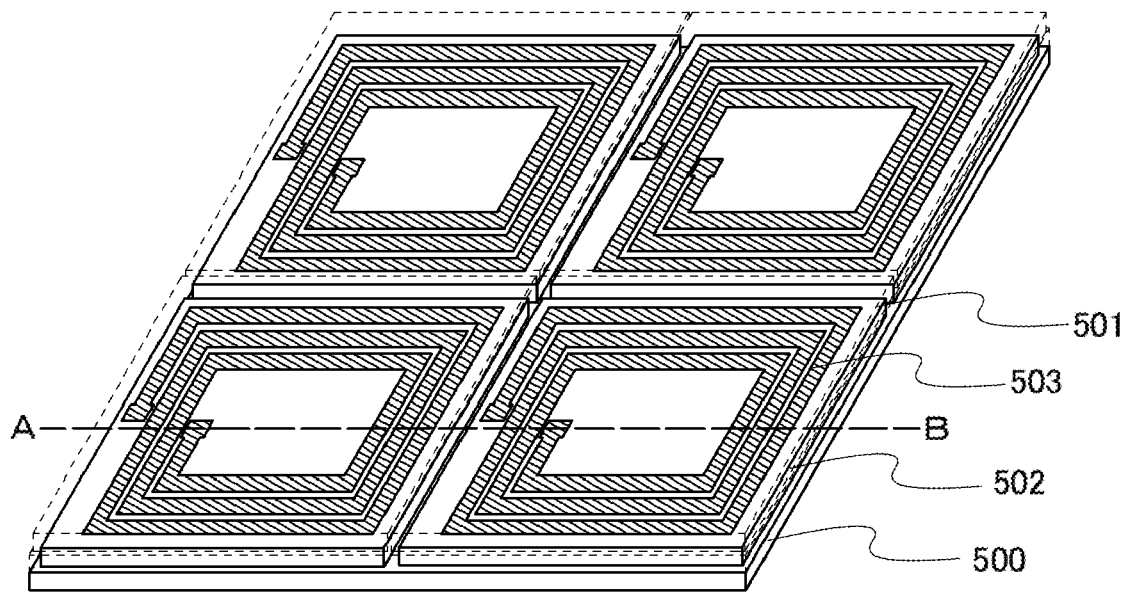

First, an example of a structure of a semiconductor device according to an embodiment of the present invention will be described. FIGS. 6A and 6B are perspective views illustrating a structure of the semiconductor device according to this embodiment.

The semiconductor device according to this embodiment includes a sealing layer 500, a sealing layer 501, and a plurality of functional circuits 502 (dashed line portions) which are covered with the sealing layers 500 and 501 (FIG. 6A).

In addition, FIG. 6B is a diagram in which the plurality of functional circuits 502 in FIG. 6A are shown by solid lines, and the sealing layers 501 are shown by dashed lines for convenience. As shown in FIG. 6B, the plurality of functional circuits 502 which are covered with the sealing layer 500 and the sealing layer 501 include antennas 503 each formed over the functional circuit 502.

Figure 7:
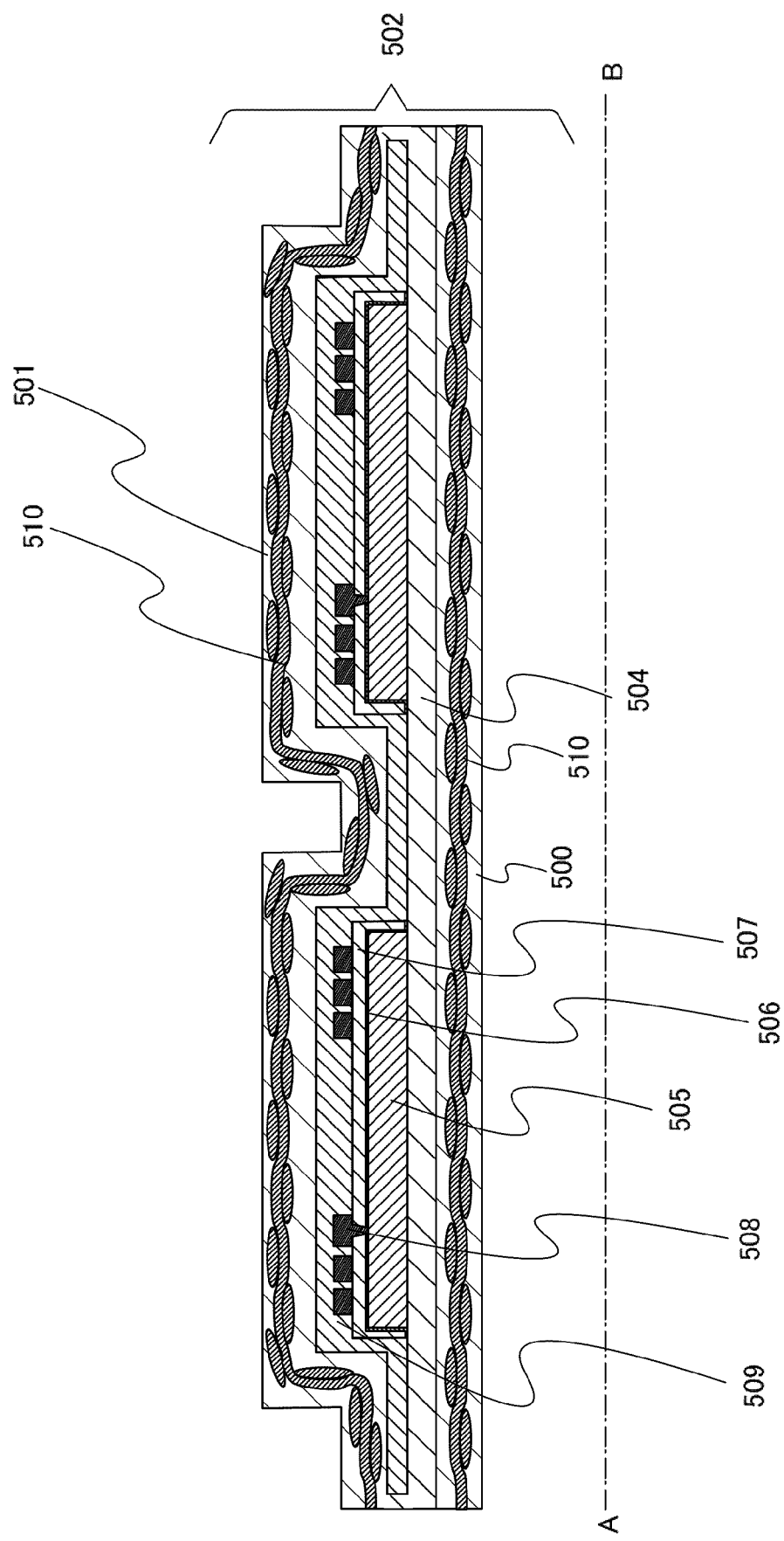
FIG. 7 is a cross-sectional view illustrating a structure of a semiconductor device, according to Embodiment 5 which is an embodiment of the present invention.

Next, a cross-sectional structure of the semiconductor device in this embodiment will be described with reference to FIG. 7. FIG. 7 is a cross-sectional view taken along line A-B in FIG. 6B.

The semiconductor device in this embodiment includes the plurality of functional circuits 502 each including the sealing layer 500, a separation layer 504 provided over the sealing layer 500, a semiconductor element layer 505 provided over the separation layer 504, a first insulating layer 506 and a second insulating layer 507 which are provided over the semiconductor element layer 505 and have an opening portion, a conductive layer 508 part of which is in contact with the semiconductor element layer 505 through the opening portion, a third insulating layer 509 provided so as to cover the conductive layer 508 and the second insulating layer 507, and the sealing layer 501 provided over the third insulating layer 509 (FIG. 7).

The sealing layer 500 is a first sealing layer, and the sealing layer 501 is a second sealing layer. The sealing layers 500 and 501 are in contact with each other at their edge portions, and the separation layer 504, the semiconductor element layer 505, the first insulating layer 506, the second insulating layer 507, the conductive layer 508, and the third insulating layer 509 are covered with a sealing layer including the sealing layers 500 and 501. As the sealing layers 500 and 501, for example, a material in which a fibrous body 510 or the like is impregnated with resin (for example, a prepreg), can be used as illustrated in FIG. 7. In this case, the fibrous body 510 is a woven or nonwoven fabric using high-strength fibers of an organic compound or an inorganic compound. The high-strength fiber is specifically a fiber with a high modulus of elasticity in tension or a fiber with a high Young's modulus. As typical examples of a high-strength fiber, a polyvinyl alcohol fiber, a polyester fiber, a polyamide fiber, a polyethylene fiber, an aramid fiber, a polyparaphenylene benzobisoxazole fiber, a glass fiber, and a carbon fiber can be given. As a glass fiber, a glass fiber using E glass, S glass, D glass, Q glass, or the like can be given. Note that the fibrous body 510 may be formed from one kind of the above high-strength fibers or a plurality of the above high-strength fibers.

When a carbon fiber is used as the fibrous body 510 to make the fibrous body 510 electrically conductive, an electrostatic breakdown can be suppressed.

The fibrous body 510 may be a woven fabric which is woven using bundles of fibers (single yarns) (hereinafter the bundles of fibers are referred to as yarn bundles) for warp yarns and weft yarns, or a nonwoven fabric obtained by stacking yarn bundles of plural kinds of fibers randomly or in one direction. In the case of a woven fabric, a plain-woven fabric, a twilled fabric, a satin-woven fabric, or the like can be used as appropriate.

The yarn bundle may have a circular shape or an elliptical shape in cross section. As the yarn bundle of fibers, a yarn bundle of fibers may be used which has been subjected to fiber opening with a high-pressure water stream, high-frequency vibration using liquid as a medium, continuous ultrasonic vibration, pressing with a roller, or the like. A yarn bundle of fibers which is subjected to fabric opening has a large width, has a smaller number of single yarns in the thickness direction, and has an elliptical shape or a flat shape in cross section. Further, by using a loosely twisted yarn for the yarn bundle of fibers, the yarn bundle is easily flattened and has an elliptical shape or a flat shape in cross section. Using a yarn bundle having an elliptical shape or a flat shape in cross section in this manner can reduce the thickness of the fibrous body 510. Accordingly, the thickness of the sealing layer 500 and the sealing layer 501 can be reduced and thus a thin semiconductor device can be manufactured. The diameters of the yarn bundle of fibers may range from 4 μm to 400 μm, preferably, from 4 μm to 200 μm. The thicknesses of the fiber may range from 4 μm to 20 μm. However, the fiber may be further thinned depending on a material of the fiber, and the thickness of the fiber may be set as appropriate in accordance with the kind of the material to be used for the fiber.

Figure 8A:
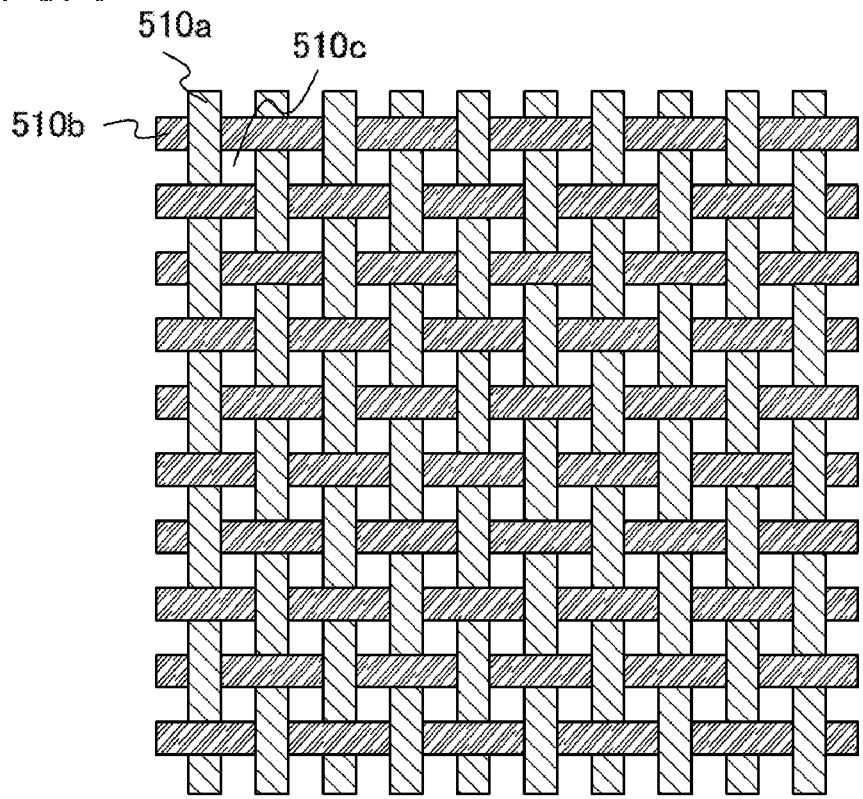
FIGS. 8A and 8B are top views each illustrating a woven fabric according to Embodiment 5.
Figure 8B:
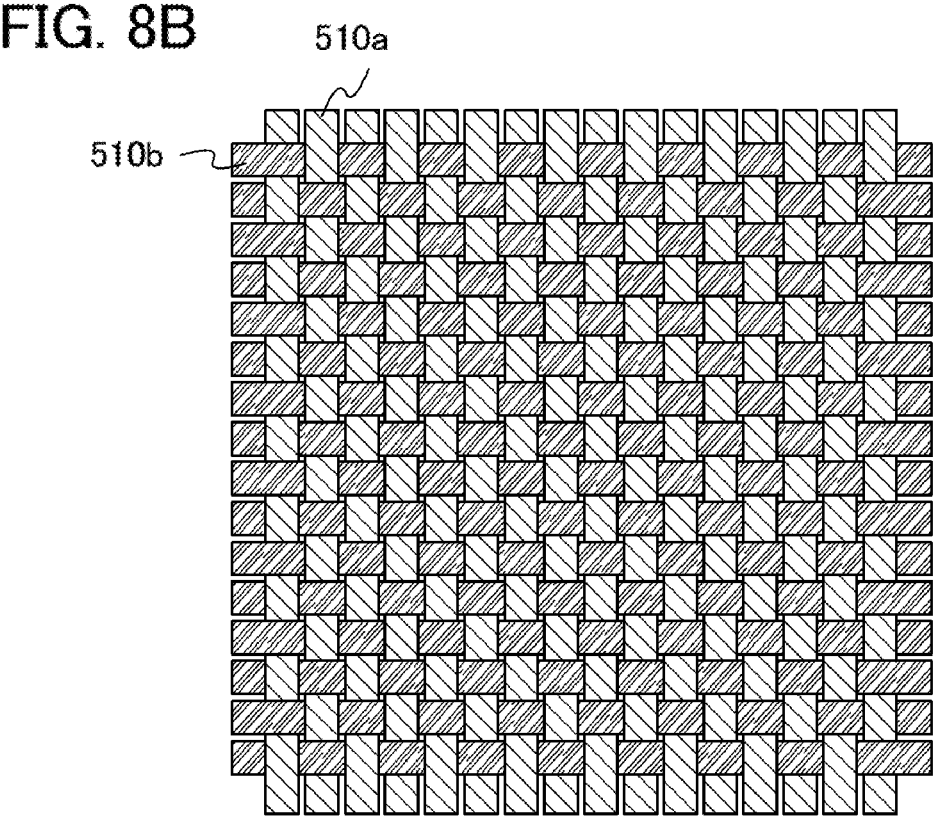

FIGS. 8A and 8B each show a top view of a woven fabric as the fibrous body 510 which is woven using yarn bundles for warp yarns and weft yarns.

The fibrous body 510 is woven using warp yarns 510a spaced at regular intervals and weft yarns 510b spaced at regular intervals (FIG. 8A). Such a fibrous body has a region without the warp yarns 510a and the weft yarns 510b (referred to as a basket hole 510c). In the fibrous body 510, the fibrous body is more easily impregnated with an organic resin, whereby adhesiveness between the fibrous body 510 and the element layer can be further increased.

In the fibrous body 510, the density of the warp yarns 510a and the weft yarns 510b may be high and the proportion of the basket hole 510c may be low (FIG. 8B). Typically, the size of the basket hole 510c is preferably smaller than the area of a locally pressed portion. More typically, the basket hole 510c preferably has a rectangular shape having a side with lengths from 0.01 mm to 0.2 mm. When the basket hole 510c of the fibrous body 510 has such a small area, even when pressure is applied by a member with a sharp tip (typically, a writing instrument such as a pen or a pencil), the pressure can be absorbed by the entire fibrous body 510.

Further, in order to enhance permeability of an organic resin into the inside of the yarn bundle of fibers, the fiber may be subjected to surface treatment. For example, as the surface treatment, corona discharge treatment, plasma discharge treatment, or the like for activating a surface of the fiber can be given. Further, surface treatment using a silane coupling agent or a titanate coupling agent can be given.

As the resin with which the fibrous body 510 is impregnated and the surface of the semiconductor element layer 505 is sealed, a thermosetting resin such as an epoxy resin, an unsaturated polyester resin, a polyimide resin, a bismaleimide-triazine resin, or a cyanate resin can be used. Alternatively, a thermoplastic resin such as a polyphenylene oxide resin, a polyetherimide resin, or a fluorine resin may be used. Alternatively, a UV curable resin or an organic plastic resin may be used. Alternatively, a plurality of the above thermosetting resins and thermoplastic resins may be used. When the above resin is used, the fibrous body 510 can be firmly fixed to the semiconductor element layer 505 by thermal treatment. Note that the higher the glass transition temperature of the resin is, the less the resin is likely to be broken by local pressure, which is preferable.

The thicknesses of each of the sealing layers 500 and 501 preferably range from 10 μm to 100 μm, more preferably from 10 μm to 30 μm. By using a sealing layer with such a thickness, a thin semiconductor device capable of being bent can be manufactured.

Highly thermally-conductive filler may be dispersed in the resin or the yarn bundle of the fibrous body 510. As the highly thermally-conductive filler, an aluminum nitride, a boron nitride, a silicon nitride, alumina, and the like can be given. As the highly thermally-conductive filler, a metal particle of silver, copper, or the like can also be given. When the conductive filler is included in the organic resin or the fiber yarn bundle, heat generated in the element layer can be easily released to the outside. Accordingly, thermal storage of the semiconductor device can be suppressed, and thus, a breakdown of the semiconductor device can be suppressed.

Alternatively, carbon particles may be dispersed in the resin or the yarn bundle of the fibrous body 510. In particular, when a thin film transistor is included in the semiconductor element layer 505, the sealing layers 500 and 501 including the resin or the fibrous body 510 in which the carbon particles are dispersed is provided below the TFT, the TFT can be prevented from being broken by static electricity.

The separation layer 504 serves as a layer for separating the semiconductor element layer 505 to be provided over another substrate and a substrate used for providing the semiconductor element layer 505. The separation layer 504 is formed to have a single-layer structure or a layered structure including a layer formed of an element such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or silicon (Si); or an alloy or compound material containing any of the elements as its main component. A layer containing silicon may have an amorphous structure, a microcrystalline structure, or a polycrystalline structure.

In the case where the separation layer 504 has a single-layer structure, a tungsten layer, a molybdenum layer, or a layer containing a mixture of tungsten and molybdenum is preferably formed. Alternatively, a layer containing oxide or oxynitride of tungsten, a layer containing oxide or oxynitride of molybdenum, or a layer containing oxide or oxynitride of a mixture of tungsten and molybdenum is formed. Note that the mixture of tungsten and molybdenum corresponds to an alloy of tungsten and molybdenum.

In the case where the separation layer 504 has a layered structure, it is preferable to form a metal layer and a metal oxide layer as the first layer and the second layer, respectively. Typically, a tungsten layer, a molybdenum layer, or a layer containing a mixture of tungsten and molybdenum is formed as the first layer, and a layer containing oxide, nitride, oxynitride, or nitride oxide of tungsten, molybdenum, or a mixture of tungsten and molybdenum is formed as the second layer.

Note that in the case where the separation layer 504 is formed to have a layered structure including a metal layer and a metal oxide layer as the first layer and the second layer, respectively, it may be utilized that a layer containing tungsten is formed as the metal layer first and an insulating layer formed of oxide is formed thereon so that a layer containing oxide of tungsten is formed as the metal oxide layer at the interface between the layer containing tungsten and the insulating layer. Further, a surface of the metal layer may be subjected to thermal oxidation treatment, oxygen plasma treatment, or treatment using a strong oxidizing solution such as ozone water to form the metal oxide layer.

Examples of an oxide of tungsten include $WO_2$, $W_2O_5$, $W_4O_{11}$, $WO_3$, and the like.

The semiconductor element layer 505 is a layer in which a semiconductor integrated circuit described in Embodiment 1 is formed. The semiconductor element layer 505 is preferably formed to thicknesses from 1 μm to 10 μm, more preferably, from 1 μm to 5 μm. When the semiconductor element layer 505 has a thickness within the above range, a semiconductor device capable of being bent can be formed. Moreover, the area of a top surface of the semiconductor device is preferably 4 mm² or more, more preferably 9 mm² or more.

Figure 9:
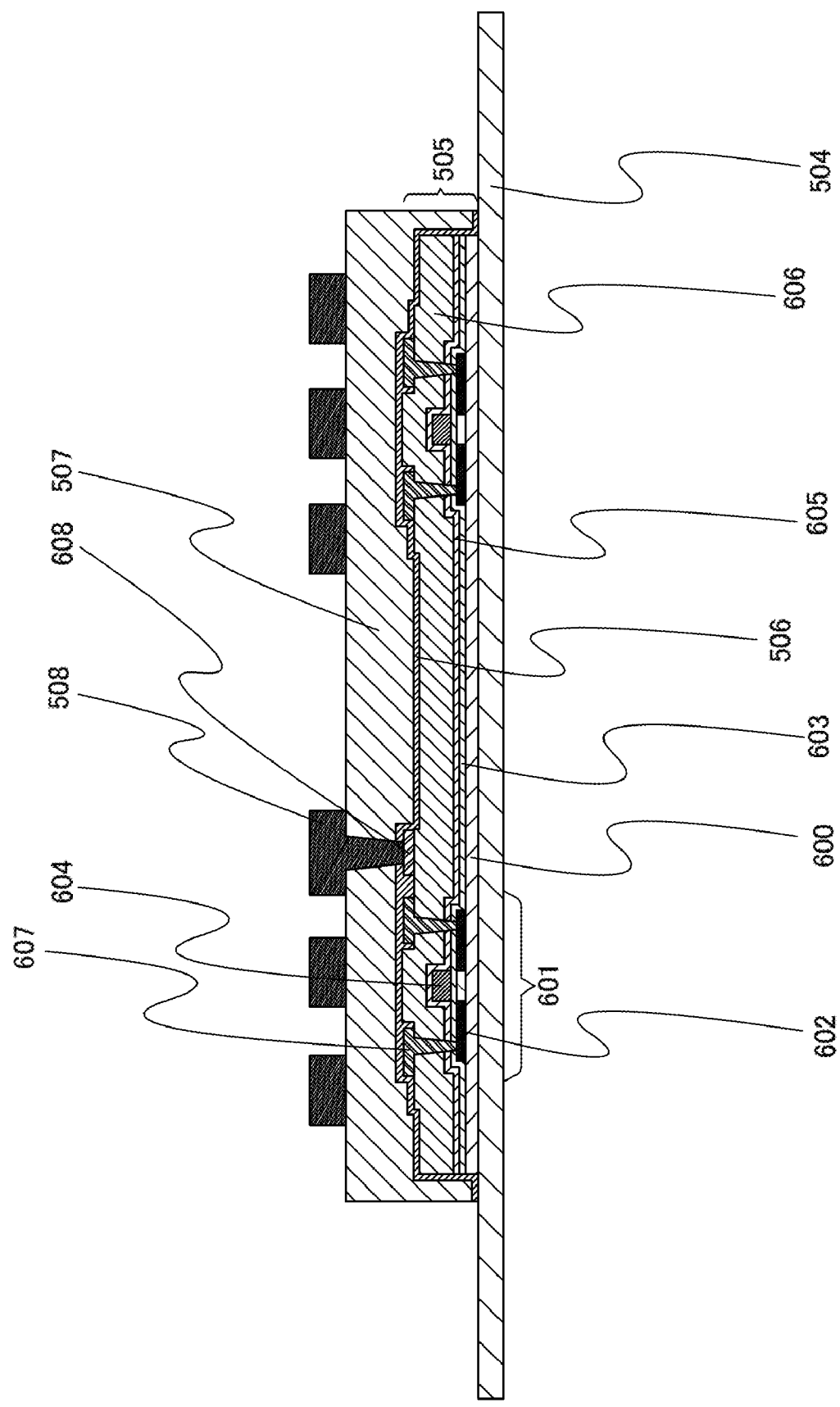
FIG. 9 is a cross-sectional view illustrating a structure of a semiconductor element layer of a semiconductor device, according to Embodiment 5 which is an embodiment of the present invention.
Figure 10:
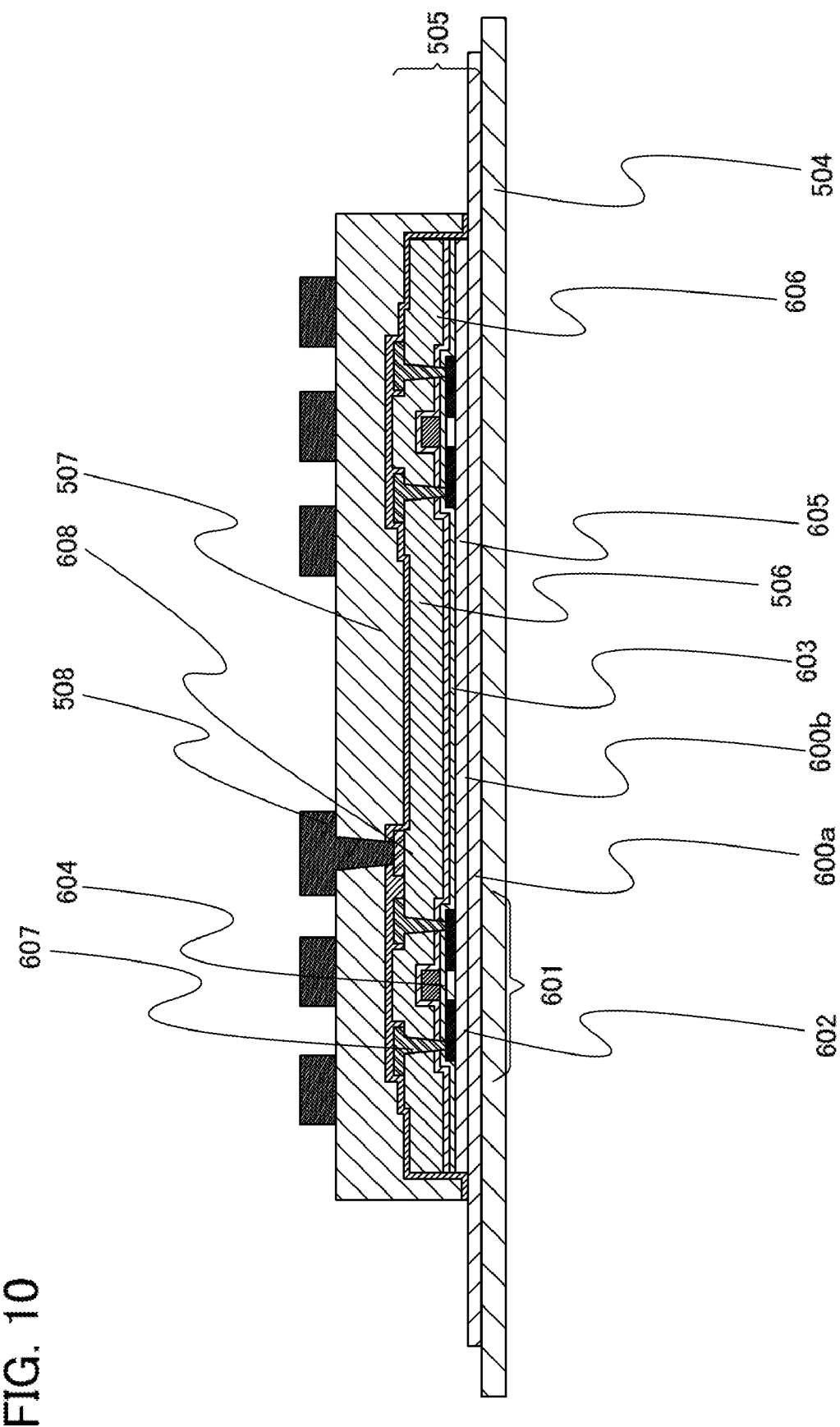
FIG. 10 is a cross-sectional view illustrating a structure of a semiconductor element layer of a semiconductor device, according to Embodiment 5 which is an embodiment of the present invention.

Here, a more specific structure of the semiconductor element layer 505 will be described with reference to FIGS. 9 and 10. FIGS. 9 and 10 are cross-sectional views each illustrating a structure of the semiconductor element layer in this embodiment.

The semiconductor element layer 505 in this embodiment includes a base layer 600 and a plurality of transistors 601 provided over the base layer 600. The plurality of transistors 601 each includes a semiconductor layer 602 including impurity regions, a gate insulating layer 603 provided so as to cover the semiconductor layer 602, a gate electrode 604 provided over part of the semiconductor layer 602 with the gate insulating layer 603 interposed therebetween, a first interlayer insulating layer 605 and a second interlayer insulating layer 606 which are provided over the gate electrode 604 and the gate insulating layer 603 and have opening portions, and electrodes 607 which are provided so as to be in contact with part of the impurity region of the semiconductor layer 602 through the opening portions (FIG. 9).

An electrode 608 provided in the same layer as the electrodes 607 of the transistor 601 is in contact with part of the conductive layer 508 through the opening portion of the first insulating layer 506 and the second insulating layer 507 in FIG. 7.

As the base layer 600, one of a silicon oxide film, a silicon oxide film containing nitrogen, a silicon nitride film, or a silicon nitride film containing oxygen; or a stack of two or more of the above films may be used.

The base layer 600 may have a two-layer structure of base layers 600a and 600b, in which one of the base layers is partly removed by etching (FIG. 10). By leaving the other of the base layers even after the etching, incorporation of impurities can be suppressed.

The semiconductor layer 602 includes a channel region and source and drain regions. As the semiconductor layer 602, an amorphous semiconductor, a microcrystalline semiconductor, a semi-amorphous semiconductor, or a polycrystalline semiconductor can be used. The microcrystalline semiconductor is a semiconductor having an intermediate structure of an amorphous structure and a crystalline structure (including a single crystal and a poly crystal) and a state which is stable in free energy, and includes a crystalline region having a short-range order along with lattice distortion. A crystal region including a crystal grain with diameters from 0.5 nm to 20 nm is included at least in part of the microcrystalline semiconductor film. When silicon is contained as the main component, a Raman spectrum is shifted to a lower wavenumber side than 520 cm$^{-1}$. Diffraction peaks of (111) and (220) which are thought to be derived from a silicon crystalline lattice are observed by X-ray diffraction. Hydrogen or halogen is contained at 1 atomic % or more to compensate a dangling bond. For example, in the case where semi-amorphous silicon (SAS) is used, the semiconductor layer 602 is formed by performing glow discharge decomposition (plasma CVD) on a material gas. As the material gas, $SiH_4$, $Si_2H_6$, $SiH_2Cl_2$, $SiHCl_3$, $SiCl_4$, $SiF_4$, or the like can be used. In addition, $GeF_4$ may be mixed into the material gas. Alternatively, the material gas may be diluted with $H_2$, or $H_2$ and one or more kinds of rare gas elements selected from He, Ar, Kr, and Ne. In this case, the dilution ratio is from 2 to 1000, the pressure is from 0.1 Pa to 133 Pa, and the power supply frequency is from 1 MHz to 120 MHz, preferably from 13 MHz to 60 MHz. In addition, the temperature for heating a substrate is 300° C. or lower. The impurity concentration of an atmospheric constituent impurity such as oxygen, nitrogen, or carbon, as an impurity element in the film, is preferably 1×10$^{20}$/cm$^{-3}$ or less; specifically, the concentration of oxygen is 5×10$^{19}$/cm$^{-3}$ or less, preferably 1×10$^{19}$/cm$^{-3}$ or less.

The impurity regions of the semiconductor layer 602 function as source and drain regions, and are formed by addition of an n-type impurity element such as phosphorus or arsenic, or a p-type impurity element such as boron. Further, electrodes which are in contact with the impurity regions function as source and drain electrodes. Further, an impurity element which imparts the same conductivity type may be added to each of the semiconductor layers 602. Alternatively, impurity elements imparting different conductivity types may be added to the semiconductor layers 602. Moreover, in this embodiment, a low-concentration impurity region (also referred to as an LDD region) whose impurity concentration is lower than that in the impurity regions serving as the source and drain regions may be provided. By providing the low-concentration impurity region, an off current can be suppressed.

As the gate insulating layer 603, one of a silicon oxide film, a silicon oxide film containing nitrogen, a silicon nitride film, and a silicon nitride film containing oxygen, or a stack of two or more of the above films may be used. The gate insulating layer 603 can be formed by a sputtering method, a plasma CVD method, or the like.

The gate electrode 604 can have a single-layer structure of a conductive film or a layered structure of two or three conductive films. As a material for the gate electrode 604, a conductive film can be used. For example, a single film of an element such as tantalum, titanium, molybdenum, tungsten, chromium, or silicon; a nitride film containing the aforementioned element (typically, a tantalum nitride film, a tungsten nitride film, or a titanium nitride film); an alloy film in which the aforementioned elements are combined (typically, a Mo—W alloy or a Mo—Ta alloy); a silicide film containing the aforementioned element (typically, a tungsten silicide film or a titanium silicide film); or the like can be used. Note that the aforementioned single film, nitride film, alloy film, silicide film, and the like can have a single-layer structure or a layered structure.

As each of the first interlayer insulating layer 605 and the second interlayer insulating layer 606, for example, one of a silicon oxide film, a silicon oxide film containing nitrogen, a silicon nitride film, or a silicon nitride film containing oxygen, or a stack of two or more of the above films can be used.

As the electrode 607, a single film of an element such as aluminum, nickel, carbon, tungsten, molybdenum, titanium, platinum, copper, tantalum, gold, or manganese, a nitride film containing the above element, an alloy film in which the above elements are combined, a silicide film containing the above element, or the like can be used. For example, as an alloy containing a plurality of the above elements, an aluminum alloy containing carbon and titanium, an aluminum alloy containing nickel, an aluminum alloy containing carbon and nickel, an aluminum alloy containing carbon and manganese, or the like can be used. For example, in the case of forming the electrode 607 having a layered structure, by employing a structure in which aluminum is interposed between molybdenum, titanium, or the like, the resistance of the aluminum to heat or chemical reaction can be increased.

Note that the structure of the semiconductor element layer 505 in this embodiment is not limited to structures shown in FIG. 9 and FIG. 10, and a semiconductor element such as a diode, a resistor, a capacitor, or a transistor having a floating gate can be provided.

Further, for example, the transistor 601 may have an inverted staggered structure, a FinFET structure, or the like without being limited to the structures shown in FIG. 9 and FIG. 10. By employing a FinFET structure, for example, a short-channel effect caused by miniaturization in size of a transistor can be suppressed. Further, a semiconductor substrate such as an SOI substrate may be used for the transistor 601. Since a transistor manufactured using a semiconductor substrate has high mobility, the size of the transistor can be reduced. Alternatively, a transistor formed using an organic semiconductor, a transistor formed using a carbon nanotube, or the like may be used.

The first insulating layer 506 functions as an interlayer insulating layer and may be formed using any one of a silicon oxide film, a silicon oxide film containing nitrogen, a silicon nitride film, and a silicon nitride film containing oxygen, or a stack of two or more of the above films, for example. By covering the semiconductor element layer 505 with the first insulating layer 506, incorporation of impurities into the semiconductor element layer 505 which is to be a semiconductor integrated circuit can be suppressed.

The second insulating layer 507 functions as an interlayer insulating layer and may be formed using resin, for example.

The conductive layer 508 functions as the antenna 503 illustrated in FIG. 6B and may be formed using any one or more of silver, gold, copper, nickel, platinum, palladium, tantalum, molybdenum, titanium, aluminum, and the like for example. In this embodiment, the antenna has a loop shape, so that the area of the functional circuit can be reduced. However, the shape of the antenna 503 is not limited to the loop shape, and any shape can be employed as long as the antenna can receive radio waves. For example, a dipole antenna, a folded dipole antenna, a slot antenna, a meander line antenna, a microstrip antenna, or the like can be used.

As the third insulating layer 509, any one of an amorphous silicon film, a silicon oxide film, a silicon oxide film containing nitrogen, a silicon nitride film, or a silicon nitride film containing oxygen, or a stack of two or more of the above films can be used. Moreover, in the case where an amorphous silicon film is used, an impurity element imparting one conductivity type may be added to the amorphous silicon film. By addition of the impurity element imparting one conductivity type, an electrostatic breakdown of an element can be prevented. Note that a semiconductor device can be reduced in thickness by not being provided with the third insulating layer 509.

In the semiconductor device illustrated in FIG. 7, the plurality of the semiconductor element layers 505, the first insulating layer 506, and the conductive layer 508 are covered with the sealing layers 500 and 501. With this structure, incorporation of impurities into the semiconductor element layer 505 which is to be a semiconductor integrated circuit can be suppressed.

Figure 11:
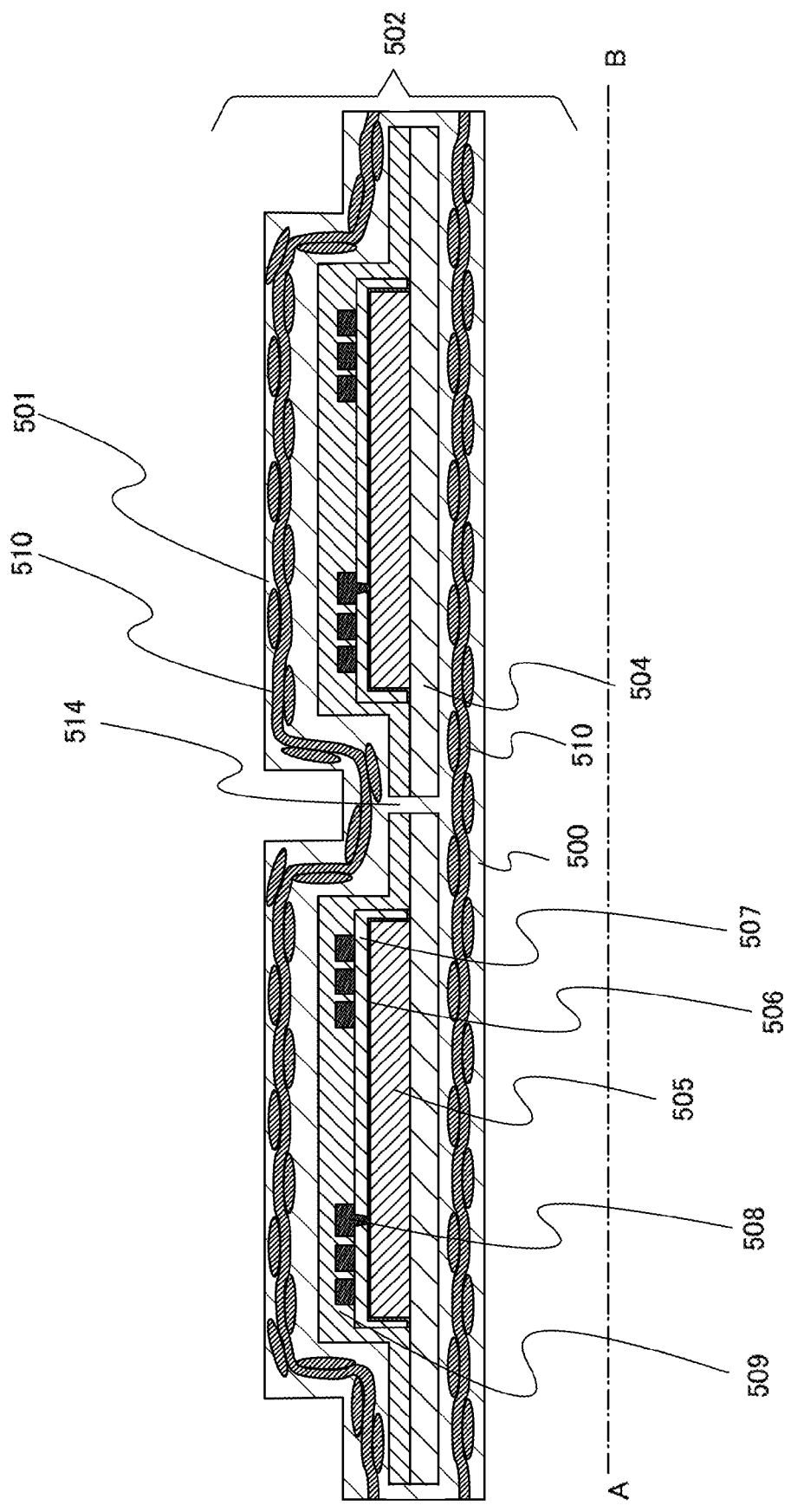
FIG. 11 is a cross-sectional view illustrating another structure of a semiconductor device, according to Embodiment 5 which is an embodiment of the present invention.

Further, as in the functional circuit 502 illustrated in FIG. 11, the semiconductor device of this embodiment may have a structure in which the sealing layer 500 and the sealing layer 501 are in contact with each other in a region 514, and the semiconductor element layer 505, the first insulating layer 506, and the conductive layer 508 are covered with the sealing layers 500 and 501. With that structure, incorporation of impurities into the semiconductor element layer which is to be a semiconductor integrated circuit can be suppressed.

In this manner, by employing the above structure for the semiconductor device of this embodiment, redundancy can be increased, and thus reliability can be increased. In addition, since incorporation of impurities into a semiconductor integrated circuit can be suppressed, stress to bending can be reduced, and thus resistance to external force can be increased, and the reliability of each functional circuit can be increased.

Next, a method for manufacturing the semiconductor device in this embodiment will be described with reference to FIGS. 12A and 12B, FIGS. 13A and 13B, FIGS. 14A and 14B, and FIGS. 15A and 15B. FIGS. 12A and 12B, FIGS. 13A and 13B, FIGS. 14A and 14B, and FIGS. 15A and 15B are cross-sectional views illustrating the method for manufacturing the semiconductor device in this embodiment. Here, as an example, a method for manufacturing the semiconductor device with the structure illustrated in FIG. 9 will be described.

The separation layer 504 is formed over a substrate 511, and the semiconductor element layer 505 is formed over the separation layer 504 (FIG. 12A). The separation layer 504 can be formed by a sputtering method, a plasma CVD method, a coating method, a printing method, or the like. Note that a coating method is a method for depositing a film by discharge of a solution on an object to be processed and includes a spin coating method and a droplet discharge method, for example. In addition, a droplet discharge method is a method for forming a pattern with a predetermined shape by discharge of a droplet of a composition containing fine particles from a small hole.

The first insulating layer 506 and the second insulating layer 507 are formed so as to cover the semiconductor element layer 505.

The first insulating layer 506 and the second insulating layer 507 are partly removed by etching (FIG. 12B). At that time, at least part of the first insulating layer 506 and part of the second insulating layer 507, which cover the semiconductor element layer 505, are left. In addition, an opening portion is formed in the part of the first insulating layer 506 and the part of the second insulating layer 507, which are left over the semiconductor element layer 505.

Figure 13A:
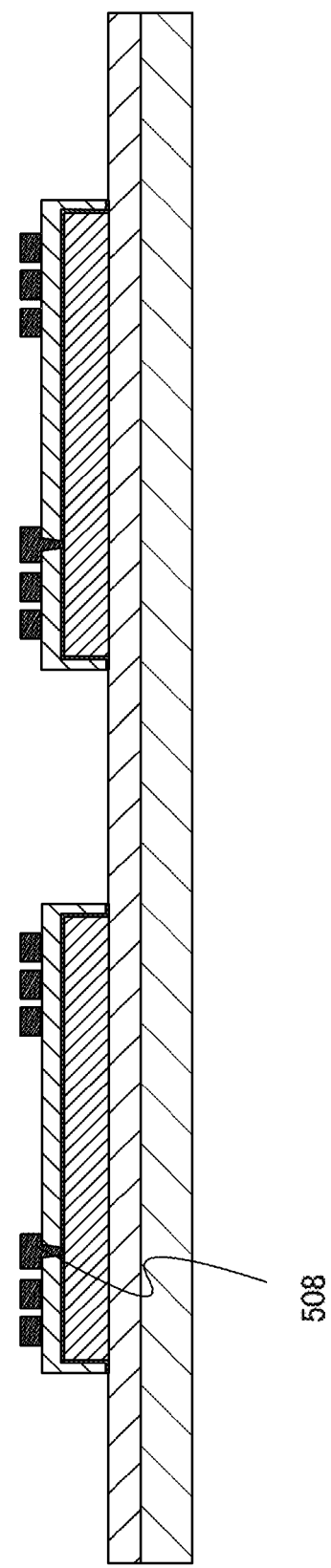
FIGS. 13A and 13B are cross-sectional views illustrating a method for manufacturing a semiconductor device, according to Embodiment 5 which is an embodiment of the present invention.

The conductive layer 508 is formed so as to be partly in contact with an electrode in the semiconductor element layer 505 with the first insulating layer 506 and the second insulating layer 507 interposed therebetween (FIG. 13A). The conductive layer 508 can be formed by discharging a droplet, a paste, or the like containing metal particles of the above material, which can be applied to the conductive film 508, to a substrate by a droplet discharge method (an ink jet method, a dispensing method, or the like), and drying and baking it. By forming the conductive layer 508 by a droplet discharge method, the number of steps can be reduced, and thus cost reduction can be achieved.

Figure 13B:
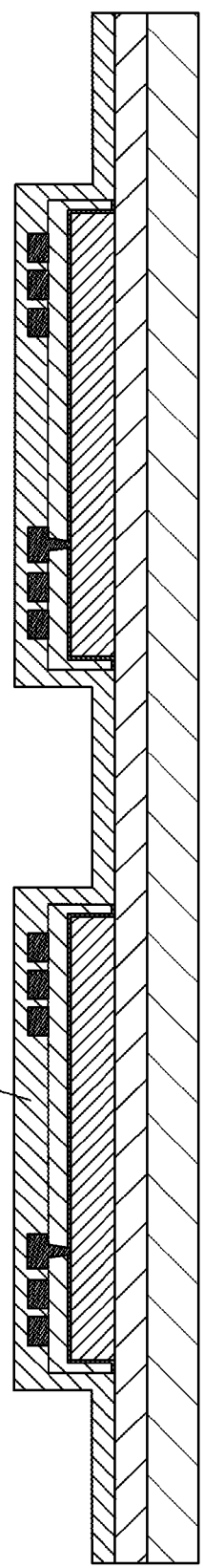

The third insulating layer 509 is formed so as to cover the second insulating layer 507 and the conductive layer 508 (FIG. 13B).

Figure 14A:
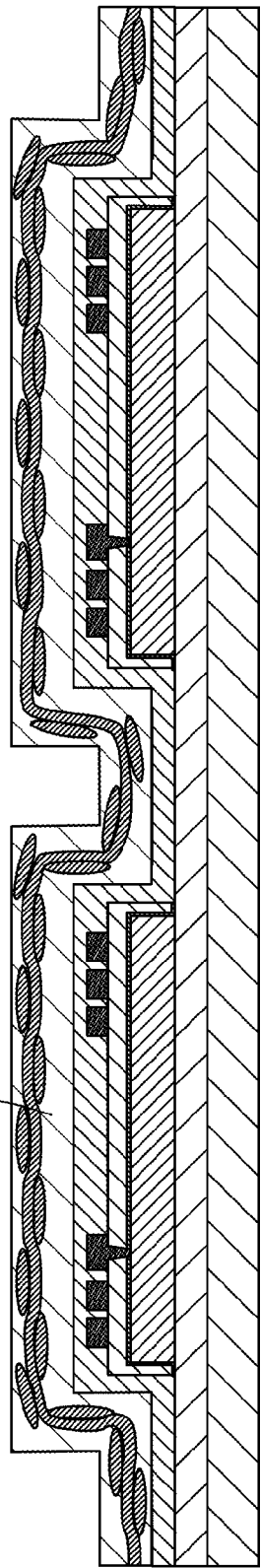
FIGS. 14A and 14B are cross-sectional views illustrating a method for manufacturing a semiconductor device, according to Embodiment 5 which is an embodiment of the present invention.

The sealing layer 501 is bonded to the third insulating layer 509 (FIG. 14A). As a bonding method, for example, a method of pressing the sealing layer 501 to bond it to the third insulating layer 509 can be given.

Figure 14B:
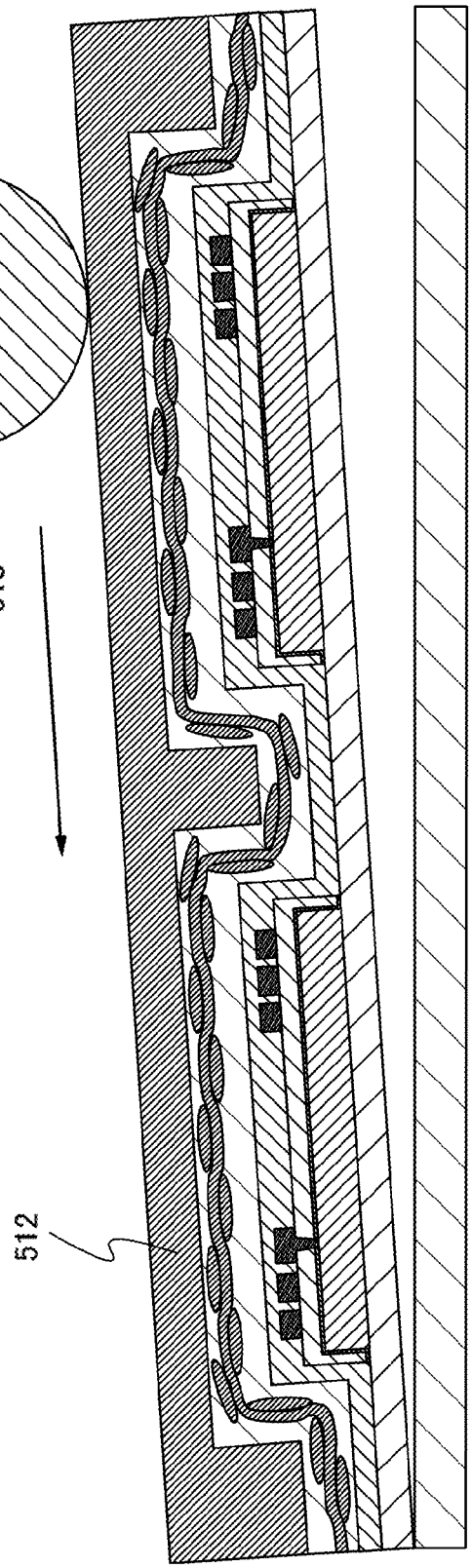

An adhesive tape 512 which can be separated by light or heat is provided over the sealing layer 501, and the separation layer 504 is separated from the substrate 511 while a roller 513 is rolled on the adhesive tape 512 (FIG. 14B).

A surface on which the separation layer 504 is formed is irradiated with a laser to form a groove 515 in part of the separation layer 504, part of the third insulating layer 509, and part of the sealing layer 501 (FIG. 15A). Note that the adhesive tape 512 may be removed before or after the formation of the groove 515.

The sealing layer 500 is bonded to the surface of the third insulating layer 509 on the side where the substrate 511 is separated (FIG. 15B). As a bonding method, for example, a method of pressing the sealing layer 500 for bonding can be given. By bonding the sealing layer 500, resin contained in the sealing layers 500 and 501 flows into the groove 515, so that the sealing layer 500 and the sealing layer 501 get together. In this case, an edge portion where the sealing layers 500 and 501 do not get together, which is on an outer side than the groove 515, may be removed.

In this manner, a semiconductor device with the structure illustrated in FIG. 9 can be manufactured. By employing the manufacturing method of this embodiment, a structure in which the semiconductor element layer 505 is interposed between the sealing layers 500 and 501 can be obtained. Note that the method for manufacturing the semiconductor device, which is described in this embodiment, is an example, and any other manufacturing method may be employed.

Figure 16:
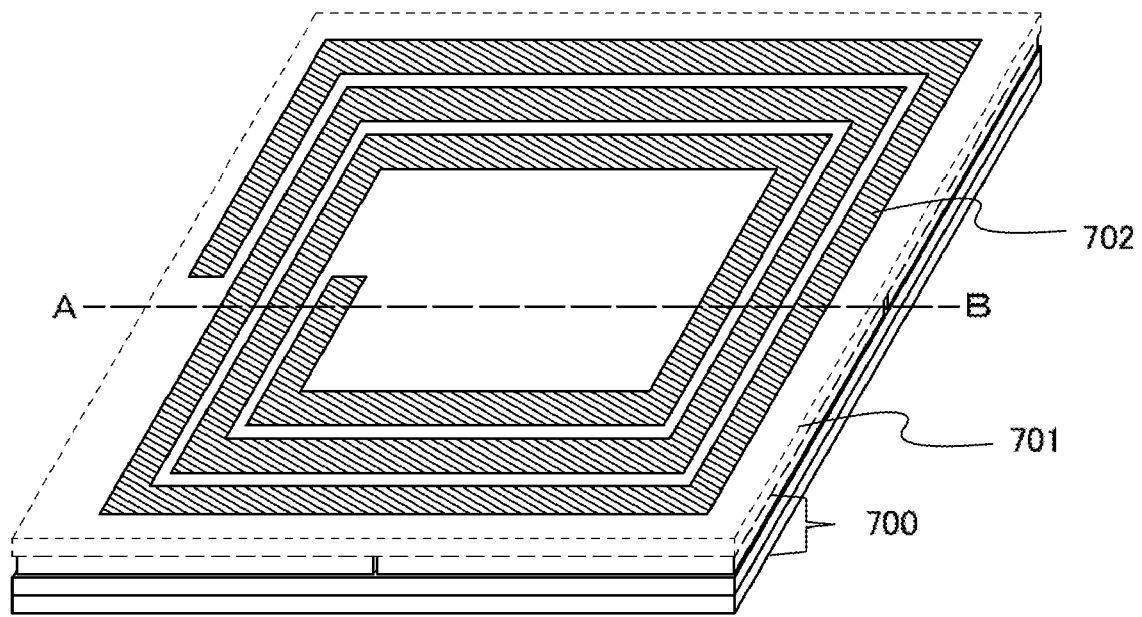
FIG. 16 is a perspective view illustrating another structure of a semiconductor device, according to Embodiment 5 which is an embodiment of the present invention.

Moreover, a semiconductor device provided with a booster antenna instead of the antenna of the functional circuit, in this embodiment, will be described with reference to FIG. 16. FIG. 16 is a perspective view illustrating another structure of the semiconductor device in this embodiment.

Another structure of the semiconductor device of this embodiment includes a functional circuit 700, a substrate 701 (a dashed line portion) provided over the functional circuit 700, and an antenna 702 provided over one surface of the substrate 701 (FIG. 16).

The functional circuit 700 has the same structure as the functional circuit 502 illustrated in FIG. 7.

Note that in this embodiment, the antenna 702 has a loop shape, so that the area of the semiconductor device can be reduced. However, the shape of the antenna 702 is not limited to the loop shape, and any shape can be employed as long as the antenna 702 can receive radio waves. For example, a dipole antenna, a folded dipole antenna, a slot antenna, a meander line antenna, a microstrip antenna, or the like can be used.

Alternatively, the antenna 702 may be attached to the functional circuit 700 without using the substrate 701. By omitting the substrate 701, the semiconductor device can be reduced in thickness.

Next, a cross-sectional structure of the semiconductor device in this embodiment will be described with reference to FIG. 17. FIG. 17 is a cross-sectional view taken along line A-B in FIG. 16.

The semiconductor device in this embodiment includes a functional circuit 700 and a substrate 701. The functional circuit 700 includes a sealing layer 703, a separation layer 704 provided over the sealing layer 703, a semiconductor element layer 705 provided over the separation layer 704, a first insulating layer 706 and a second insulating layer 707 which are provided over the semiconductor element layer 705 and have an opening portion, a conductive layer 708 part of which is in contact with the semiconductor element layer 705 through the opening portion, a third insulating layer 709 provided so as to cover the conductive layer 708 and the second insulating layer 707, and the sealing layer 710 provided over the third insulating layer 709. The substrate 701 is formed over a sealing layer 710 and provided with a conductive layer 711 (FIG. 17).

Note that structures and materials which can be employed for the sealing layer 500, the separation layer 504, the semiconductor element layer 505, the first insulating layer 506, the second insulating layer 507, the conductive layer 508, the third insulating layer 509, and the sealing layer 501 in FIG. 7 can be employed for the sealing layer 703, the separation layer 704, the semiconductor element layer 705, the first insulating layer 706, the second insulating layer 707, the conductive layer 708, the third insulating layer 709, and the sealing layer 710, respectively (FIG. 17).

The conductive layer 711 functions as the antenna 702 which is a booster antenna in FIG. 16 and can be formed using one or more of silver, gold, copper, nickel, platinum, palladium, tantalum, molybdenum, titanium, aluminum, and the like, for example.

Note that in this embodiment, the antenna 702 has a loop shape, so that the area of the functional circuit can be reduced. However, the shape of the antenna 702 is not limited to the loop shape, and any shape can be employed as long as the antenna can receive radio waves. For example, a dipole antenna, a folded dipole antenna, a slot antenna, a meander line antenna, a microstrip antenna, or the like can be used.

In this manner, in the case of a structure in which the conductive layer 708 which is to be a first antenna and the conductive layer 711 which is to be a second antenna serving as a booster antenna are provided, power can be exchanged without contact between the first antenna and the second antenna. In addition, by providing the second antenna, there is no limitation on the frequency band of receivable radio waves, and thus the communication distance can be extended.

Figure 18A:
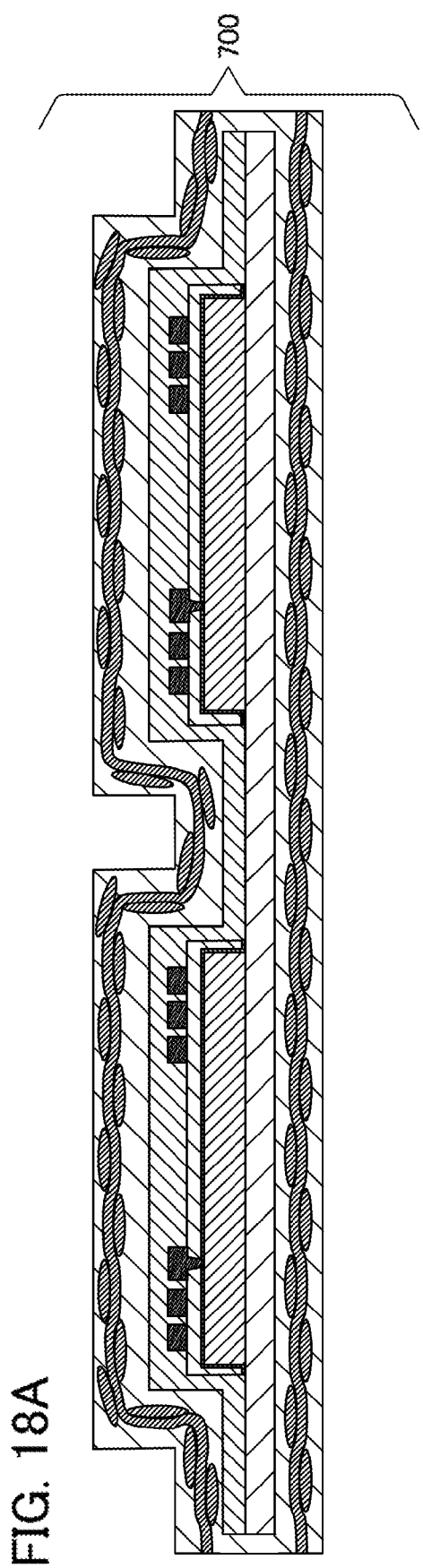
FIGS. 18A and 18B are cross-sectional views illustrating a method for manufacturing a semiconductor device, according to Embodiment 5 which is an embodiment of the present invention.
Figure 18B:
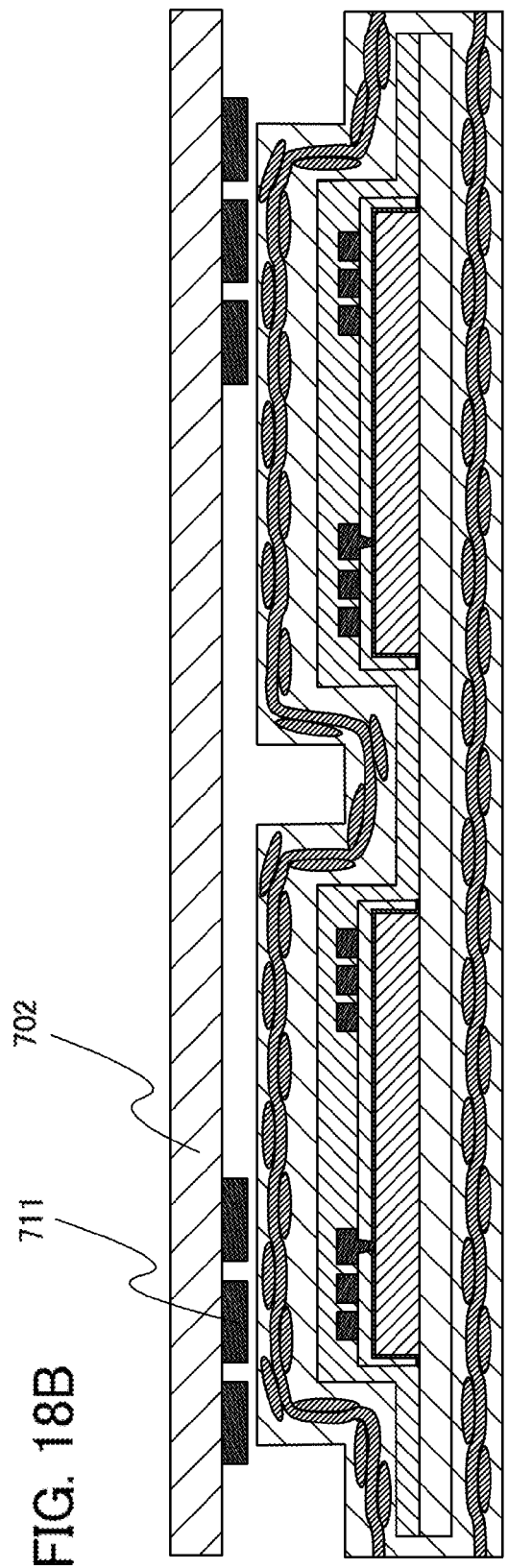
Figure 19A:
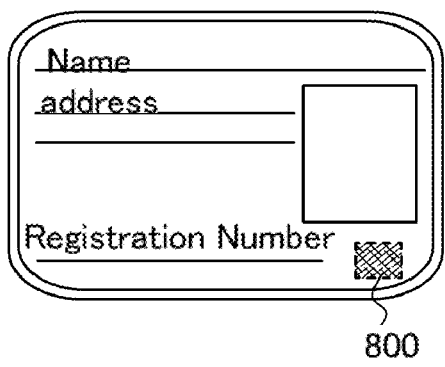
FIGS. 19A to 19F are diagrams illustrating application examples of a semiconductor device, according to Embodiment 6 which is an embodiment of the present invention.
Figure 19B:
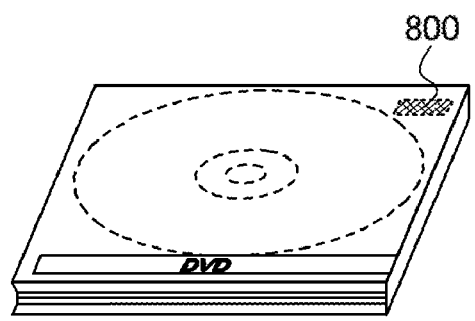
Figure 19C:
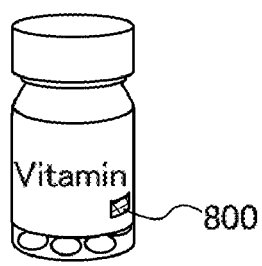
Figure 19D:
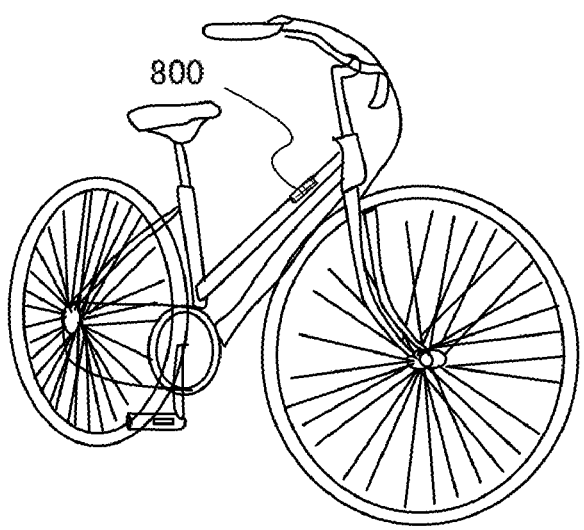
Figure 19E:
Figure 19F:
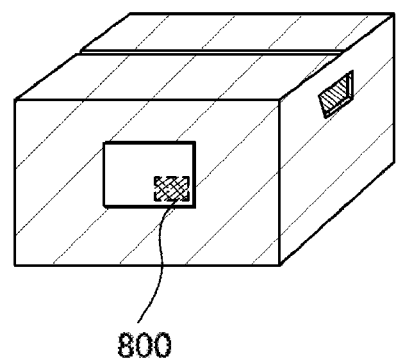

Next, a method for manufacturing the semiconductor device in FIG. 17 will be described (FIGS. 18A and 18B). FIGS. 18A and 18B are cross-sectional views illustrating a method for manufacturing the semiconductor device of this embodiment having another structure.

The functional circuit 700 is formed by the method for manufacturing the semiconductor device, which is illustrated in FIGS. 12A and 12B, FIGS. 13A and 13B, FIGS. 14A and 14B, and FIGS. 15A and 15B (FIG. 18A).

The functional circuit 700 and the substrate 701 on which the conductive layer 711 is formed are attached to each other so that a surface on which the conductive layer 711 is formed faces the functional circuit 700 (FIG. 18B). At that time, the substrate 701 and the functional circuit 700 may be attached to each other with an adhesive layer interposed therebetween. By providing the adhesive layer, bonding strength of the surfaces attached can be increased.

As described above, a semiconductor device provided with the second antenna (the antenna 702) can be manufactured. By employing the manufacturing method in this embodiment, a structure in which the semiconductor element layer 705 is covered with the sealing layers 703 and 710 can be obtained. Further, even in the case of using the second antenna, by providing a plurality of functional circuits under the second antenna, the area of the semiconductor device can be reduced.

Note that the method for manufacturing the semiconductor device, which is described in this embodiment, is an example, and any other manufacturing method may be employed.

Note that this embodiment can be combined with any of the other embodiments, as appropriate.

Embodiment 6

In this embodiment, application examples of the semiconductor device according to an embodiment of the present invention are described.

Specific application examples of the semiconductor device according to an embodiment of the present invention will be described (FIGS. 19A to 19F). FIGS. 19A to 19F are diagrams illustrating application examples of the semiconductor device in this embodiment.

Application examples of the semiconductor device in the above embodiments will be described (FIGS. 19A to 19F). The semiconductor device is widely used by being provided in, for example, bills, coins, securities, bearer bonds, documents (such as driver's licenses or resident's cards, see FIG. 19A), packaging containers (such as wrapping paper or bottles, see FIG. 19C), storage media (such as DVD software or video tapes, see FIG. 19B), vehicles (such as bicycles, see FIG. 19D), personal belongings (such as bags or glasses), foods, plants, animals, human bodies, clothing, everyday articles, products such as electronic appliances (liquid crystal display devices, EL display devices, television sets, or mobile phones), or tags on products (see FIGS. 19E and 19F), or the like.

A semiconductor device 800 according to an embodiment of the present invention is fixed to products by, for example, being mounted on a printed board, being attached to a surface thereof, or being embedded therein. For example, the semiconductor device 800 can be embedded in paper of a book, or embedded in an organic resin of a package. Since the semiconductor device 800 according to an embodiment of the present invention can be reduced in size, thickness, and weight, it can be fixed to products without spoiling the design thereof. Further, bills, coins, securities, bearer bonds, documents, or the like can have identification functions by being provided with the semiconductor device 800 according to an embodiment of the present invention, and the identification functions can be utilized to prevent counterfeits. Further, the efficiency of a system such as an inspection system can be improved by providing the semiconductor device of the present invention in, for example, packaging containers, storage media, personal belongings, foods, clothing, everyday articles, or electronic appliances. Even vehicles can have higher security against theft or the like by being provided with the semiconductor devices of the present invention.

As described above, since the semiconductor device according to an embodiment of the present invention has high reliability, by using the semiconductor device for purposes given in this embodiment, authentication, security, or the like of a product can be improved.

This application is based on Japanese Patent Application serial no. 2008-237863 filed with Japan Patent Office on Sep. 17, 2008, the entire contents of which are hereby incorporated by reference.

The invention claimed is:

1. A semiconductor device comprising:
an antenna
an input circuit configured to generate a DC voltage from an Ac signal supplied from the antenna;
a filter;
a circuit for generating a constant voltage configured to generate the constant voltage from the DC voltage supplied through the filter;
a circuit portion comprising a memory; and
a feedback circuit configured to change impedance of the semiconductor device in accordance with the constant voltage,
wherein the constant voltage is supplied to the circuit portion and the feedback circuit from the circuit for generating the constant voltage,
wherein the input circuit is directly connected to the antenna, and
wherein the feedback circuit is directly connected to the antenna.

2. The semiconductor device according to claim 1,
wherein the filter comprises a resistor and a capacitor,
wherein a terminal of the resistor is electrically connected to a terminal of the capacitor and the input of the circuit configured to generate the constant voltage, and another terminal of the resistor is electrically connected to an output of the input circuit, and
wherein another terminal of the capacitor is electrically connected to the feedback circuit.

3. The semiconductor device according to claim 1,
wherein the filter comprises an inductor and a capacitor,
wherein a terminal of the inductor is electrically connected to a terminal of the capacitor and the input of the circuit configured to generate the constant voltage, and another terminal of the inductor is electrically connected to an output of the input circuit, and
wherein another terminal of the capacitor is electrically connected to the feedback circuit.

4. The semiconductor device according to claim 1,
wherein the feedback circuit comprises a resistor and a transistor,
wherein one of a source or a drain of the transistor is electrically connected to a terminal of the resistor and the other of the source or the drain of the transistor is electrically connected to the filter,
wherein a gate of the transistor is electrically connected to the output of the circuit configured to generate the constant voltage, and wherein another terminal of the resistor is electrically connected to the input circuit.

5. The semiconductor device according to claim 1,
wherein the feedback circuit comprises a capacitor and a transistor,
wherein one of a source or a drain of the transistor is electrically connected to a terminal of the capacitor and the other of the source or the drain of the transistor is electrically connected to the filter,
wherein a gate of the transistor is electrically connected to an output of the circuit configured to generate the constant voltage, and
wherein another terminal of the capacitor is electrically connected to the input circuit.

6. The semiconductor device according to claim 1,
wherein the feedback circuit comprises a diode and a transistor.

7. A semiconductor device comprising:
an antenna;
an input circuit configured to generate a DC voltage from an AC signal supplied from the antenna;
a filter;
a circuit for generating a constant voltage configured to generate the constant voltage from the DC voltage supplied through the filter;
a circuit portion; and
a feedback circuit configured to change impedance of the semiconductor device in accordance with the constant voltage,
wherein the constant voltage is supplied to the circuit portion and the feedback circuit from the circuit for generating the constant voltage,
wherein the input circuit is directly connected to the antenna, and
wherein the feedback circuit is directly connected to the antenna.

8. The semiconductor device according to claim 7,
wherein the filter comprises a resistor and a capacitor,
wherein a terminal of the resistor is electrically connected to a terminal of the capacitor and the input of the circuit configured to generate the constant voltage, and another terminal of the resistor is electrically connected to an output of the input circuit, and
wherein another terminal of the capacitor is electrically connected to the feedback circuit.

9. The semiconductor device according to claim 7,
wherein the filter comprises an inductor and a capacitor,
wherein a terminal of the inductor is electrically connected to a terminal of the capacitor and the input of the circuit configured to generate the constant voltage, and another terminal of the inductor is electrically connected to an output of the input circuit, and
wherein another terminal of the capacitor is electrically connected to the feedback circuit.

10. The semiconductor device according to claim 7,
wherein the feedback circuit comprises a resistor and a transistor,
wherein one of a source or a drain of the transistor is electrically connected to a terminal of the resistor and the other of the source or the drain of the transistor is electrically connected to the filter,
wherein a gate of the transistor is electrically connected to the output of the circuit configured to generate the constant voltage, and
wherein another terminal of the resistor is electrically connected to the input circuit.

11. The semiconductor device according to claim 7,
wherein the feedback circuit comprises a capacitor and a transistor,
wherein one of a source or a drain of the transistor is electrically connected to a terminal of the capacitor and the other of the source or the drain of the transistor is electrically connected to the filter,
wherein a gate of the transistor is electrically connected to an output of the circuit configured to generate the constant voltage, and
wherein another terminal of the capacitor is electrically connected to the input circuit.

12. The semiconductor device according to claim 7,
wherein the feedback circuit comprises a diode and a transistor.

* * * * *